(12) United States Patent
Enomoto et al.

(10) Patent No.: US 10,512,022 B2
(45) Date of Patent: Dec. 17, 2019

(54) TERMINAL APPARATUS, RELAY TERMINAL APPARATUS, AND COMMUNICATION CONTROL METHOD

(71) Applicant: SHARP KABUSHIKI KAISHA, Osaka (JP)

(72) Inventors: Masayuki Enomoto, Osaka (JP); Masafumi Aramoto, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 203 days.

(21) Appl. No.: 15/033,655

(22) PCT Filed: Nov. 5, 2014

(86) PCT No.: PCT/JP2014/079348
§ 371 (c)(1),
(2) Date: May 2, 2016

(87) PCT Pub. No.: WO2015/068731
PCT Pub. Date: May 14, 2015

(65) Prior Publication Data
US 2016/0286459 A1 Sep. 29, 2016

(30) Foreign Application Priority Data

Nov. 5, 2013 (JP) ................................ 2013-229106

(51) Int. Cl.
*H04B 7/14* (2006.01)
*H04W 40/22* (2009.01)
(Continued)

(52) U.S. Cl.
CPC ......... *H04W 40/22* (2013.01); *H04L 65/1069* (2013.01); *H04L 65/4076* (2013.01);
(Continued)

(58) Field of Classification Search
None
See application file for complete search history.

(56) References Cited

U.S. PATENT DOCUMENTS 9,591,679 B2 * 3/2017 Bontu ................. H04W 76/023
2013/0016630 A1 1/2013 Bhushan et al.
(Continued)

FOREIGN PATENT DOCUMENTS

JP 2013030867 A 2/2013
WO 2013010014 A1 1/2013

OTHER PUBLICATIONS

International Patent Application No. PCT/JP2014/079348, International Preliminary Report on Patentability dated May 19, 2016, 11 pages.
(Continued)

*Primary Examiner* — Kwang B Yao
*Assistant Examiner* — Juvena W Loo
(74) *Attorney, Agent, or Firm* — Kilpatrick Townsend & Stockton LLP

(57) ABSTRACT

To provide a mobile communication system that efficiently establishes a communication path in order for a terminal apparatus to be connected to a network via a relay terminal apparatus positioned in proximity to perform the transmission and reception of data.
Means for detecting for a relay terminal positioned in proximity and means for selecting the relay terminal apparatus are provided. A connection procedure of suppressing unnecessary control information and suppressing a processing load of the relay terminal apparatus is performed.

4 Claims, 10 Drawing Sheets

(51) Int. Cl.
*H04W 76/11* (2018.01)
*H04W 8/00* (2009.01)
*H04L 29/08* (2006.01)
*H04L 29/06* (2006.01)
*H04W 4/06* (2009.01)
*H04W 68/00* (2009.01)
*H04W 76/40* (2018.01)
*H04W 88/04* (2009.01)
*H04W 76/14* (2018.01)

(52) U.S. Cl.
CPC ............ *H04L 67/141* (2013.01); *H04W 4/06* (2013.01); *H04W 8/005* (2013.01); *H04W 68/005* (2013.01); *H04W 76/11* (2018.02); *H04W 76/40* (2018.02); *H04W 76/14* (2018.02); *H04W 88/04* (2013.01)

(56) References Cited

U.S. PATENT DOCUMENTS

| | | | | |
|---|---|---|---|---|
| 2013/0196638 A1* | 8/2013 | Kim | ........................ | H04W 4/02 455/414.1 |
| 2014/0179305 A1* | 6/2014 | Singh | .................... | H04W 4/005 455/426.1 |
| 2015/0036578 A1* | 2/2015 | Wu | ........................ | H04L 12/189 370/312 |
| 2015/0036579 A1* | 2/2015 | Wu | ........................ | H04B 7/15 370/312 |
| 2016/0119963 A1* | 4/2016 | Casati | .................. | H04W 76/14 455/434 |
| 2016/0156404 A1* | 6/2016 | Wolfner | ................ | H04W 76/14 370/315 |
| 2016/0197927 A1* | 7/2016 | Ma | ........................ | H04W 4/90 726/4 |
| 2016/0234806 A1* | 8/2016 | Le Thierry D'Ennequin | .............. | H04W 4/06 |

OTHER PUBLICATIONS

"3GPP TR 22.803 V12.2.0 (Jun. 2013) Technical Report: $3^{rd}$ Generation Partnership Project; Technical Specification Group Services and System Aspects; Feasibility study for Proximity Services (ProSe) (Release 12)," 2013, pp. 1-45, 3GPP Organizational Partners, Valbonne, France.

"Discussion on RAN2 Aspects of D2D Communication," 3GPP TSG-RAN WG2 Meeting #83, Barcelona, Spain, Aug. 19-23, 2013, pp. 1-6, R2-032824, Intel Corporation.

"3GPP TR 23.703 V0.7.1 (Sep. 2013) Technical Report: $3^{rd}$ Generation Partnership Project; Technical Specification Group Services and System Aspects; Study on architecture enhancements to support Proximity Services (ProSe) (Release 12)," 2013, pp. 1-241, 3GPP Organizational Partners, Valbonne, France.

"3GPP TS 23.401 V11.7.0 (Sep. 2013) Technical Specification: $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 111)," 2013, pp. 1-286, 3GPP Organizational Partners, Valbonne, France.

International Patent Application No. PCT/JP2014/079348, International Search Report dated Feb. 3, 2015, 5 pages.

SA WG2 Meeting #98, Valencia, Spain Jul. 15-19, 2013, "L2 ProSe UE-to-Network Relays with Bearer sharing" (5 pages).

* cited by examiner

TERMINAL APPARATUS, RELAY TERMINAL APPARATUS, AND COMMUNICATION CONTROL METHOD

CROSS REFERENCE TO RELATED APPLICATIONS

This application is the U.S. national phase of International Application No. PCT/JP2014/079348 filed on Nov. 5, 2014, and published in Japanese on May 14, 2015, as International Publication No. WO 2015/068731 A1, which application claims priority to Japanese Patent Application No. 2013-229106 filed on Nov. 5, 2013, the contents of all of which are incorporated herein by reference.

TECHNICAL FIELD

The present invention relates to a terminal apparatus, a relay terminal apparatus, and a communication control method.

BACKGROUND ART

In the 3rd Generation Partnership Project (3GPP) which is the standardization group for a mobile communication system, the specification work of evolved packet system (EPS) described in NPL 1 as the next generation mobile communication system has progressed, and a wireless LAN (WLAN) as well as Long Term Evolution (LTE) as an access system connected to the EPS has been examined.

In the 3GPP, as described in NPL 2, proximity services (ProSe) of notifying user equipment (UE) of the presence of another user equipment in proximity have been examined. In the ProSe, the UE directly performs the transmission and reception of data by establishing a direct communication path with the UE in proximity without using a base station.

In the ProSe, in order to perform the transmission and reception of data between the UEs, the transmission and reception of data can be performed without using an access network based on an access technology such as LTE or a mobile communication network such as a core network, and thus, an offload effect of avoiding traffic concentration is expected.

In the ProSe, the use of two methods as a direct communication path between the UEs has been examined. The first method is a method (hereinafter, referred to as LTE Direct) of establishing the direct communication path between the UEs using an LTE access technology, and the second method is a method of establishing the direct communication path using a wireless LAN access technology.

In the LTE Direct, the UE uses a commercial frequency allocated in an LTE system of each mobile communication provider, and directly transmits and receives data to and from another UE by using an LTE communication system.

In the WLAN Direct, the UE uses a non-commercial frequency allocated in the WLAN, and directly transmits and receives data to and from another UE.

In the ProSe, the necessity for the UE to detect the presence of a communication target UE in proximity by discovering the communication target UE in order to transmit and receive data through the LTE Direct or the WLAN Direct is given as a service request condition.

In the ProSe, it has been examined that any one of the UEs that perform direct communication is connected to another UE by establishing a direct communication path with another UE and is connected to a base station disposed in an access network of the related art.

The UE connected to the base station is connected to the core network via the base station to establish the communication path. It has been examined that the UE connected to the base station relays the direct communication path with the other UE and the communication network with the core network. In the relaying of the ProSe, the UE that has established the direct communication path and has established the communication path by being connected to the core network has a function of receiving transmission data of the UE connected through the direct communication path and delivering the data to the core network. This UE has a relay function of receiving data delivered from the communication path connected to the core network and transmitting the data to the UE connected to the direct communication path through the direct communication path.

As stated above, the ProSe is used to provide a service of notifying a certain UE of the presence of a UE in proximity, a service of providing communication through the direct communication path between the UEs, and the relay function of the UE.

CITATION LIST

Non Patent Literature

NPL 1: 3GPP TS23.401, Technical Specification Group Services and System Aspects, General Packet Radio Service (GPRS) enhancements for Evolved Universal Terrestrial Radio Access Network (E-UTRAN) access NPL 2: 3GPP TR22.803, Technical Specification Group Services and System Aspects, Feasibility study for Proximity Services (ProSe)

SUMMARY OF INVENTION

Technical Problem

However, specific means of a communication path establishing method for realizing the relaying in the ProSe is not currently decided. Thus, even though a certain UE having no connectivity with the base station establishes a direct communication path with a UE having connectivity with the base station and communication can be performed between the UEs, it is difficult for the UE to establish connectivity with the core network via the base station.

Means of the UE for detecting the UE having the relay function is not apparent. The UE newly needs means for detecting a proximity UE and detecting whether or not the proximity UE has the relay function.

In the detection of the UE having the relay function, a method of reducing the number of times control information is transmitted and received as small as possible such that power consumption of the UE is not required as less as possible is desirable.

It is considered that the UE having the relay function is connected to the plurality of UEs by establishing direct communication paths with a plurality of UEs to provide the relay function. In a case where there is a plurality of UE candidates having a relay function capable of being connected to a certain UE, if UEs are excessively connected to the specific UE having the relay function, since a relay processing load is increased, a method of considering a load balance is needed in the selection of the UE having the relay function.

The present invention has been made in view of such circumstances, and it is an object of the invention to provide a mobile communication system for realizing the transmission and reception of data between a UE and a UE having a relay function and between the UE having the relay function and a core network by allowing the UE to be connected to the UE having the relay function by efficiently discovering the UE having the relay function in a case where the transmission and reception of data are performed in ProSe.

Solution to Problem

In view of the above-described problems, the present invention provides a communication control method used in a relay terminal apparatus. The method includes: a step of transmitting a Packet data network (PDN) connection request message to a core network; a step of receiving a response to the PDN connectivity request message and receiving an access point name (APN) and an IP address from the response to establish PDN connection; and a step of broadcasting notification information including service identification information associated with the PDN connection to a proximity terminal.

A communication control method of the present invention is a communication control method used in a terminal apparatus. The method includes: a step of receiving notification information from a relay terminal apparatus, and receiving service identification information included in the notification information; a step of selecting the relay terminal apparatus based on the service identification information; a step of transmitting a PDN connectivity request message to the selected relay terminal apparatus, and requesting to establish PDN connection; a step of receiving a response message to the PDN connectivity request message, and receiving an IP address and an access point name (APN) included in the response message; and a step of transmitting and receiving data via the relay terminal apparatus by using the IP address.

A relay terminal apparatus of the present invention is a relay terminal apparatus that performs the transmission and reception of data between a terminal apparatus and a core network by establishing a direct communication path with the terminal apparatus by a communication method based on LTE and establishing a communication path with the core network. The relay terminal apparatus is configured to: transmit a PDN connectivity request message to the core network; receive a response to the PDN connectivity request message, which includes an access point name (APN) and an IP address, to establish PDN connection, and broadcast notification information including service identification information associated with the PDN connection to a proximity terminal.

A terminal apparatus of the present invention is a terminal apparatus that performs the transmission and reception of data by establishing a direct communication path with a relay terminal apparatus by a communication method based on LTE and by being connected to a core network via the relay terminal apparatus. The terminal apparatus is configured to: receive notification information from the relay terminal apparatus, and receive service identification information included in the notification information; select the relay terminal apparatus based on the service identification information; transmit a PDN connectivity request message to the selected relay terminal apparatus, and request to establish PDN connection; receive a response message to the PDN connectivity request message, and receive an IP address and an access point name (APN) included in the response message; and transmit and receive data to and from the core network via the relay terminal apparatus by using the IP address.

Advantageous Effects of Invention

According to the present invention, a terminal apparatus detects a relay terminal apparatus positioned in proximity, and can establish a direct communication path with a relay station. The terminal apparatus establishes a communication path with a core network via the relay terminal apparatus, and can perform the transmission and reception of data.

In the detection of the relay terminal apparatus, it is possible to detect and select the relay terminal apparatus depending on a communication service desired by the terminal apparatus.

The relay terminal apparatus establishes a direct communication path with the terminal apparatus positioned in proximity and establishes a communication path with the core network. Thus, the relay terminal apparatus can relay communication between the terminal apparatus and the core network via these communication paths.

The relay terminal apparatus notifies of a communication service to be relayed, and the terminal apparatus includes means for selecting the relay terminal apparatus. Thus, it is possible to perform a communication path establishing procedure.

DESCRIPTION OF EMBODIMENTS

Hereinafter, preferred embodiments for implementing the present invention will be described with reference to the drawings. In the present embodiment, embodiments of a mobile communication system to which the present invention applies as an example will be described in detail with reference to the drawings. LTE Direct is described as LTE (D). Here, the LTE(D) refers to a direct communication path between UEs which is established using an LTE communication method.

[1. First Embodiment]

Initially, a first embodiment to which the present invention applies will be described with reference to the drawings.

[1.1 Outline of Mobile Communication System]

Figure 1:
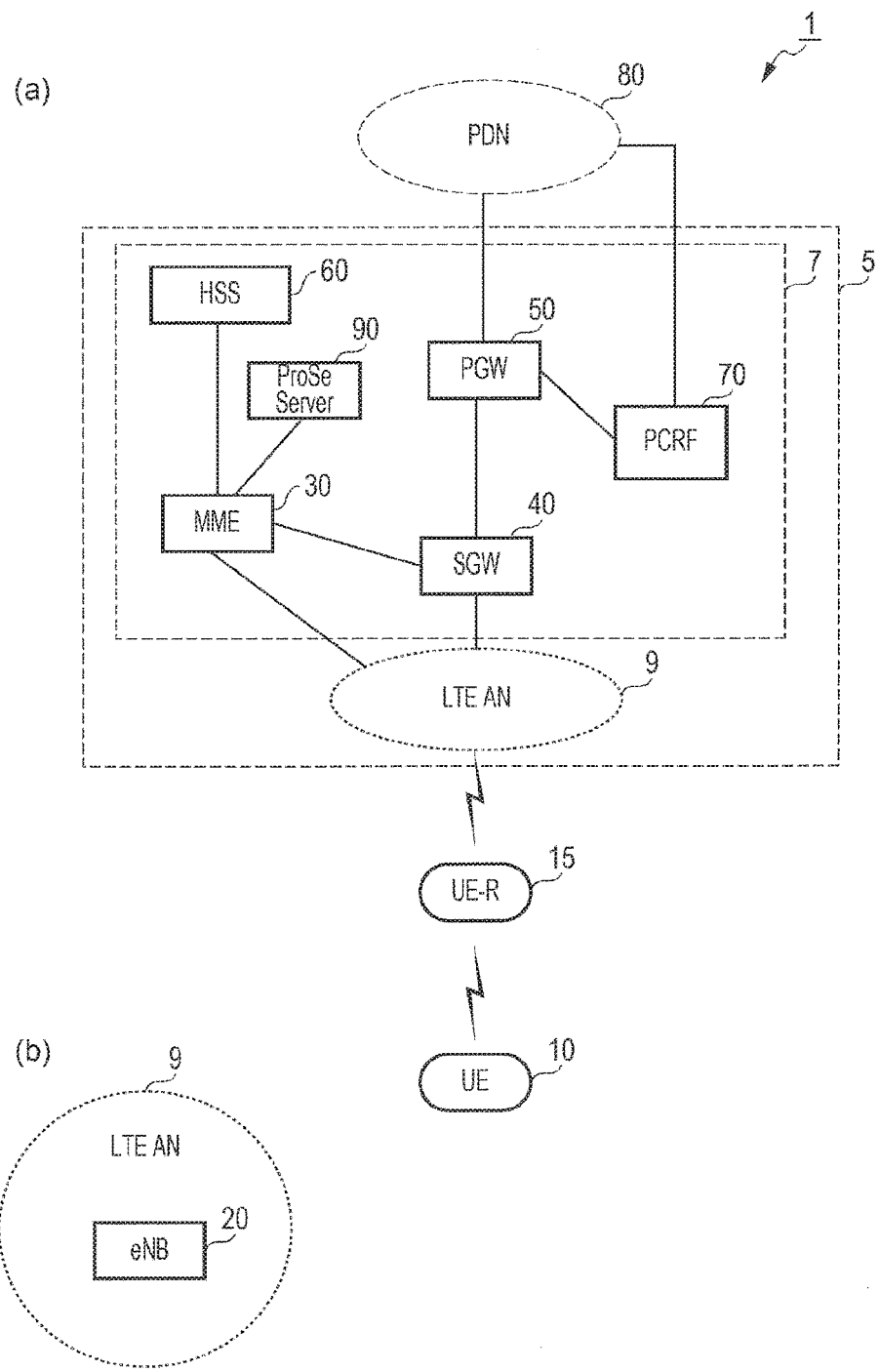
FIG. 1 is a diagram for describing the outline of a mobile communication system 1 according to a first embodiment.

FIG. 1 is a diagram for describing the outline of a mobile communication system 1 according to the present invention. As shown in FIG. 1(a), the mobile communication system 1 is structured such that a UE (terminal apparatus) 10, a UE-R (relay terminal apparatus) 15, and a packet data network (PDN) 80 are connected via an IP mobile communication network 5. The UE 10 and the UE-R 15 are positioned in the proximity of each other, and can be connected through the LTE(D). The UE-R 15 is connected to the IP mobile communication network 5, and the IP mobile communication network 5 is connected to the PDN 80.

For example, the IP mobile communication network 5 may be a network that includes a wireless access network and a core network operated by a mobile communication provider, or may be a broadband network operated by a fixed-line communication provider. Here, the broadband network may be an IP communication network that is connected by an asymmetric digital subscriber line (ADSL) to provide high-speed communication through a digital line such as an optical fiber and is operated by the communication provider. The IP mobile communication network is not limited to the above-described examples, and may be a network that wirelessly accesses using Worldwide Interoperability for Microwave Access (WiMAX).

The UE 10 and the UE-R 15 are communication terminals that are connected using an access system such as LTE or WLAN, and can be connected to the IP access network by being connected through the installing of a 3GPP LTE communication interface or a WLAN communication interface.

As a specific example, there is a portable phone terminal, a smart phone, a home appliance, a tablet computer or a personal computer having another communication function.

The PDN 80 is a network that provides a network service of transmitting and receiving data as a packet, and is, for example, the Internet or IMS. The PDN may be a network that provides a group communication service such as a group phone call.

The UE-R 15 is a relay terminal apparatus, and the UE-R 15 can be connected to, but not limited to the UE 10, a plurality of terminal apparatuses by establishing a direct communication path through the LTE(D). The relay terminal apparatus is a terminal apparatus having a relay function, and the UE-R 15 establishes a communication path by being connected to the IP mobile communication network, and establishes to connectivity with the PDN 80.

The UE-R 15 has a relay function of relaying communication between the UE 10 and the PDN 80, and thus, the UE 10 realizes the transmission and reception of data to and from the PDN 80.

As stated above, the UE 10 and the UE-R 15 may have the same structure except for the presence of the relay function.

The PDN 80 is connected to an IP access network by using a wired line. For example, the PDN is constructed using an asymmetric digital subscriber line (ADSL) or an optical fiber. However, the PDN is not limited to the above-described examples, and may be a wireless access network such as Long Term Evolution (LTE), wireless LAN (WLAN), or Worldwide Interoperability for Microwave Access (WiMAX).

[1.1.1 Structure Example of IP Mobile Communication Network]

As shown in FIG. 1, the mobile communication system 1 includes the UE 10, the UE-R 15, the IP mobile communication network 5, and the packet data network (PDN) 80. A plurality of communication terminals other than the UE 10 may be connected to the UE-R 15. These communication terminals have the same structure as that of the UE 10, and the description thereof will be omitted for simplifying the drawings. A plurality of terminal apparatuses having a relay function other than the UE-R 15 can be connected to the IP mobile communication network 5. The terminal apparatus has the same structure as that of the UE-R, and the description thereof will be omitted for simplifying the drawings. The IP mobile communication network 5 includes a core network 7, and a wireless access network.

The core network 7 includes a mobile management entity (MME) 30, a serving gateway (SGW) 40, a PGW (access control apparatus) 50 (Packet Data Network Gateway), a home subscriber server (HSS) 60, a policy and charging rules function (PCRF) 70, and a ProSe Server 90.

The wireless access network is connected to a core network 7. The UE-R 15 can be wirelessly connected to the wireless access network.

As the wireless access network, an LTE access network (LTE AN 9) capable of being connected by an LTE access system may be used.

Since the respective apparatuses have the same structures as those of the apparatuses of the related art in the mobile communication system using an EPS, the detailed description thereof will be omitted, but the functions thereof will be briefly described. The PGW 50 is connected to the PDN 80, the SGW 40 and the PCRF 70, and delivers user data, as a gateway apparatus between the PDN 80 and the core network 7.

The SGW 40 is connected to the PGW 50, the MME 30, and the LTE AN 9, and delivers user data, as a gateway apparatus between the core network 7 and the LTE AN 9.

The MME 30 is connected to the SGW 40 and the LTE AN 9, and is a control apparatus that performs access control and position management of the UE 10 via the LTE AN 9.

The HSS 60 is connected to the MME 30, and manages subscriber information. The PCRF 70 is connected to the PGW 50, and manages QoS for data transmission. The ProSe Server 90 is connected to the MME 30, and is a management apparatus that manages the establishment of a direct communication path between the communication terminals. The ProSe Server 90 and the MME 30 may be realized as a single apparatus, or may be respectively realized independent apparatuses. It has been described that the ProSe Server is included in the core network 7, but is not limited thereto, and may be included in the PDN 80. The ProSe Server may be realized as a single apparatus with an application server (GCSE AS: Group communication Service Enablers Application Server) of group communication which is included in the PDN to provide a group communication service.

As shown in FIG. 1(b), the wireless access network includes an apparatus (for example, a base station apparatus or an access point apparatus) to which the UE10-R 15 is connected in actuality. As the apparatus used in the connection, various apparatuses applied to the wireless access network are considered, but the LTE AN 9 includes the eNB 20 in the present embodiment. The eNB 20 is a wireless base station to which the UE-R 15 is connected in the LTE access system, and the LTE AN 9 may include one or a plurality of radio base stations.

In the present specification, the UE-R 15 being connected to the wireless access network means that the UE-R is connected to the base station apparatus included in the wireless access network, and a signal or data is also transmitted and received via the base station apparatus or the access point.

For example, the UE-R 15 being connected to the LTE AN 9 means that the UE-R 15 is connected to the LTE AN 9 via the eNB 20.

[1.2 Apparatus Structure]

Hereinafter, each apparatus structure will be briefly described with reference to the drawings.

[1.2.1 Structure of UE]

Figure 2:
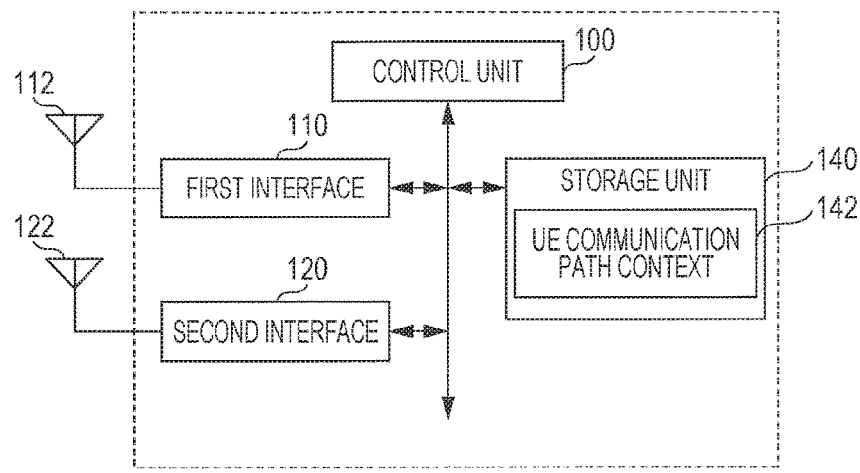
FIG. 2 is a diagram for describing a functional structure of a UE according to the embodiment.

A functional structure of the UE 10 according to the present embodiment is illustrated based on FIG. 2. In the UE 10, a first interface 110, a second interface 120, and a storage unit 140 are connected to a control unit 100 through a bus.

The control unit 100 is a functional unit for controlling the UE 10. The control unit 100 realizes various processes by reading various programs and various information items stored in the storage unit 140 and executing the read programs.

The first interface 110 is a functional unit that establishes a direct communication path with another communication terminal or the UE-R 15 by an LTE access scheme to perform the transmission and reception of data through wireless communication. An external antenna 112 is connected to the first interface 110.

The UE 10 establishes a direct communication path with another UE or the UE-R through the first interface without using the LTE base station, and can perform communication.

The second interface 120 is a functional unit that is connected to the eNB 20 by the LTE access scheme to establish a communication path to the PDN 80 via the core network 7 and performs the transmission and reception of data through wireless communication. An external antenna 120 is connected to the second interface 120.

The UE 10 is connected to the LTE AN 9 through the second interface to establish a communication path with the PDN 80 through the core network 7, and can perform the transmission and reception of data.

Although it has been described in the drawing that the first interface 110 and the second interface 120 perform the communication through different antennas, one antenna may be used in common.

The storage unit 140 is a functional unit that stores programs or data required in various operations of the UE 10. For example, the storage unit 140 is realized using a semiconductor memory, or a hard disk drive (HDD). The storage unit 140 stores a UE communication path context 142.

The UE communication path context 142 is an information group stored in association with a communication path established by the UE, and may include an access point name (APN), a bearer ID, a PDN connection ID, a Tunnel Endpoint Identifier (TEID), base station identification information, service identification information, and group identification information.

The access point name (APN) is identification information used to select the PGW 50 in the IP mobile communication network 5, and is identification information associated with the PDN 80. In a case where a different PDN 80 is associated with each service such as IMS or image distribution, the APN may be used as identification information for identifying a service.

The bearer ID is information for identifying a radio bearer which is a radio communication path between the UE 10 and the UE-R 15, which is established when the UE 10 is connected to the UE-R 15. In a case where the UE 10 is connected to the eNB 20, the bearer ID may be information for identifying a radio bearer which a radio communication path between the UE 10 and the eNB 20, which is established when the UE 10 is connected to the eNB 20.

The PDN connection ID is information for identifying PDN connection which is a logical path established by the UE 10 with the PGW 50.

The TEID is identification information of a tunnel communication path for delivering user data, which constitutes the PDN connection, and may be identification information of a tunnel communication path established based on a GTP protocol, a Mobile IP protocol, or a Proxy Mobile IP protocol.

The base station identification information may be information for identifying the UE-R 15, or may be information for identifying the eNB 20. The base station identification information may be obtained by combining a provider identification code for identifying the mobile communication provider that provides the communication service with a base station identification code. Accordingly, the base station identification information may be used as unique identification information in a plurality of mobile communication networks provided by a plurality of mobile communication providers.

The service identification information is information for identifying a service provided by the mobile communication provider in the IP communication network 5. The service identification information may be an APN, or may be service domain identification information such as a fully qualified domain name (FQDN). The service identification information is not limited to the above-described examples, and may be identification information associated with the service. The service may be a voice communication service based on the IMS or a video distribution service, or may be a service that provides group communication. The service identification information is identification information for identifying such services.

The group identification information may be information for identifying a group when two or more communication terminals constitute the group and communication is performed between the groups. In a case where a plurality of contents is delivered to the group, the group identification information may be information for identifying these contents. For example, the group identification information may be information for identifying the terminal group when a simultaneous phone call is performed between the plurality of communication terminals. Alternatively, the group identification information may be information for identifying a session for the phone call. Alternatively, when image distribution is performed to the plurality of communication terminals, the group identification information may be identification information for identifying the terminals that receives the image distribution as the group, or may be identification information for identifying the distributed image in a case where there are plurality of images.

The group identification information may be an IP multicast address, or may be a temporary mobile subscriber identify (TMSI) which is a temporary ID which is assigned by the communication provider and is used to authenticate a user. The group identification information is not limited to the above-described examples, and may be information, such as a mail address, for identifying the group.

A plurality of communication terminals, but not limited to the UE 10, may be connected to the UE-R 15. The structure of these communication terminals are the same structure as that of the UE 10, and thus, the detailed description thereof will be omitted.

[1.2.2 Structure of UE-R]

Figure 3:
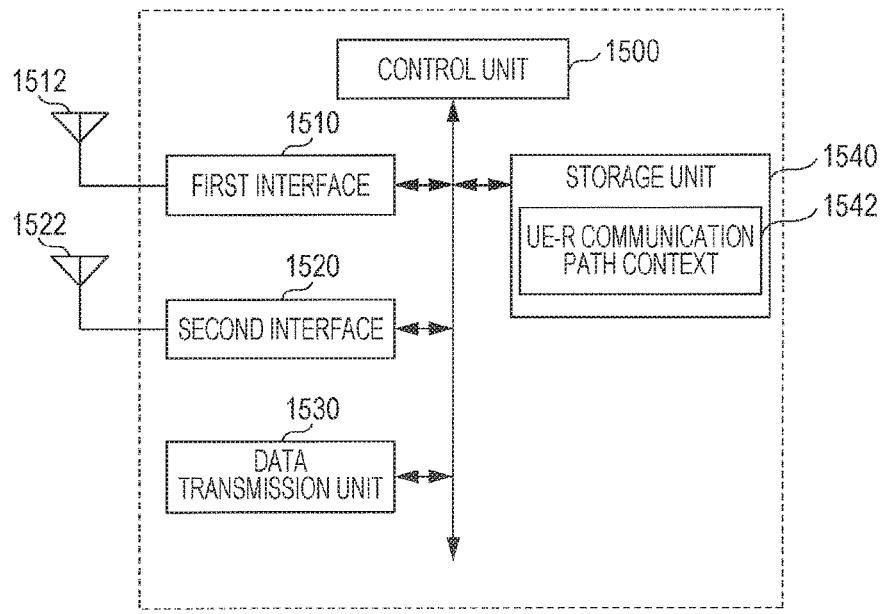
FIG. 3 is a diagram for describing a functional structure of a UE-R according to the embodiment.

A functional structure of the UE-R 15 according to the present embodiment is illustrated based on FIG. 3. In the UE-R 15, a first interface 1510, a second interface 1520, a data transmission unit 1530, and a storage unit 1540 are connected to a control unit 1500 through a bus.

The control unit 1500 is a functional unit for controlling the UE-R 15. The control unit 1500 realizes various processes by reading various information items and various programs stored in the storage unit 1540 and executing the read information items and programs.

The first interface 1510 is a functional unit that establishes a direct communication path with another communication terminal such as the UE 10 by the LTE access scheme to perform the transmission and reception of data through wireless communication. An external antenna 1522 is connected to the first interface 1510.

The UE-R 15 establishes a direct communication path with another communication terminal such as the UE 10 through the first interface 1510 without using the LTE base station, and can perform communication.

The second interface 1520 is a functional unit that is connected to the eNB 20 by the LTE access scheme, establishes a communication path to the PDN 80 through the core network 7, and performs the transmission and reception of data through wireless communication. An external antenna 1522 is connected to the second interface 1520.

The UE-R 15 is connected to the LTE AN 9 through the second interface 1520 to establish a communication path with the PDN 80 through the core network 7, and can perform the transmission and reception of data.

Although it has been described in the drawing that the first interface 1510 and the second interface 1520 perform the communication through different antennas, one antenna may be used in common.

The storage unit 1540 is a functional unit that stores programs or data required in various operations of the UE-R 15. For example, the storage unit 1540 is realized using a semiconductor memory, or a hard disk drive (HDD). The storage unit 1540 stores a UE-R communication path context 1542.

The UE-R communication path context 142 is an information group stored in association with a communication path established by the UE-R 15, and may include an access point name (APN), a bearer ID, a PDN connection ID, a Tunnel Endpoint Identifier (TEID), base station identification information, service identification information, and group identification information.

The access point name (APN) is identification information used to select the PGW 50 in the IP mobile communication network 5, and is identification information associated with the PDN 80. In a case where a different PDN 80 is associated with each service such as IMS or image distribution, the APN may be used as identification information for identifying a service.

The bearer ID is information for identifying a radio bearer which is a radio communication path between the UE 10 and the UE-R 15, which is established when the UE 10 is connected to the UE-R 15. In a case where the UE 10 is connected to the eNB 20, the bearer ID may be information for identifying a radio bearer which a radio communication path between the UE 10 and the eNB 20, which is established when the UE 10 is connected to the eNB 20.

The PDN connection ID is information for identifying PDN connection which is a logical path established by the UE 10 with the PGW 50.

The TEID is identification information of a tunnel communication path for delivering user data, which constitutes the PDN connection, and may be identification information of a tunnel communication path established based on a GTP protocol, a Mobile IP protocol, or a Proxy Mobile IP protocol.

The base station identification information may be information for identifying the UE-R 15, or may be information for identifying the eNB 20. The base station identification information may be obtained by combining a provider identification code for identifying the mobile communication provider that provides the communication service with a base station identification code. Accordingly, the base station identification information may be used as unique identification information in a plurality of mobile communication networks provided by a plurality of mobile communication providers.

The service identification information is information for identifying a service provided by the mobile communication provider in the IP communication network 5. The service identification information may be an APN, or may be service domain identification information such as a fully qualified domain name (FQDN). The service identification information is not limited to the above-described examples, and may be identification information associated with the service. The service may be a voice communication service based on the IMS or a video distribution service, or may be a service that provides group communication. The service identification information is identification information for identifying such services.

The group identification information may be information for identifying a group when two or more communication terminals constitute the group and communication is performed between the groups. In a case where a plurality of contents is delivered to the group, the group identification information may be information for identifying these contents. For example, the group identification information may be information for identifying the terminal group when a simultaneous phone call is performed between the plurality of communication terminals. Alternatively, the group identification information may be information for identifying a session for the phone call. Alternatively, when image distribution is performed to the plurality of communication terminals, the group identification information may be identification information for identifying the terminals that receives the image distribution as the group, or may be identification information for identifying the distributed image in a case where there are plurality of images.

The group identification information may be an IP multicast address, or may be a temporary mobile subscriber identify (TMSI) which is a temporary ID which is assigned by the communication provider and is used to authenticate a user. The group identification information is not limited to the above-described examples, and may be information, such as a mail address, for identifying the group.

The UE-R communication path context 1542 may be retained for each communication path. For example, the UE-R communication path context may be retained for each of the direct communication path established with the UE 10 and the communication path which is connected to the eNB 20 and is connected to the PGW 50.

Here, the base station information of the UE-R communication path context 1542 with respect to the direct communication path may be information for identifying the UE-R 15, and the base station information of the UE-R communication path context 1542 with respect to the communication path which is connected to the eNB 20 and is connected to the PGW 50 may be information for identifying the eNB 20.

The data transmission unit 1530 is a functional unit that transmits reception data from the UE 10, which is received through the first interface 1510, to the IP mobile communication network through the second interface 1520, and transmits reception data addressed to the UE 10, which is received through the second interface 1520, to the UE 10 through the first interface 1510.

A plurality of communication terminals, but not limited to the UE 10, may be connected to the UE-R 15. A plurality of communication terminals having a relay function, but not limited to the UE-R 15, may be connected to the eNB 20. The structure of the communication terminal having these relay functions is the same as that of the UE-R 15, and thus, the detailed description thereof will be omitted.

[1.2.3 Structure of eNB]

Figure 4:
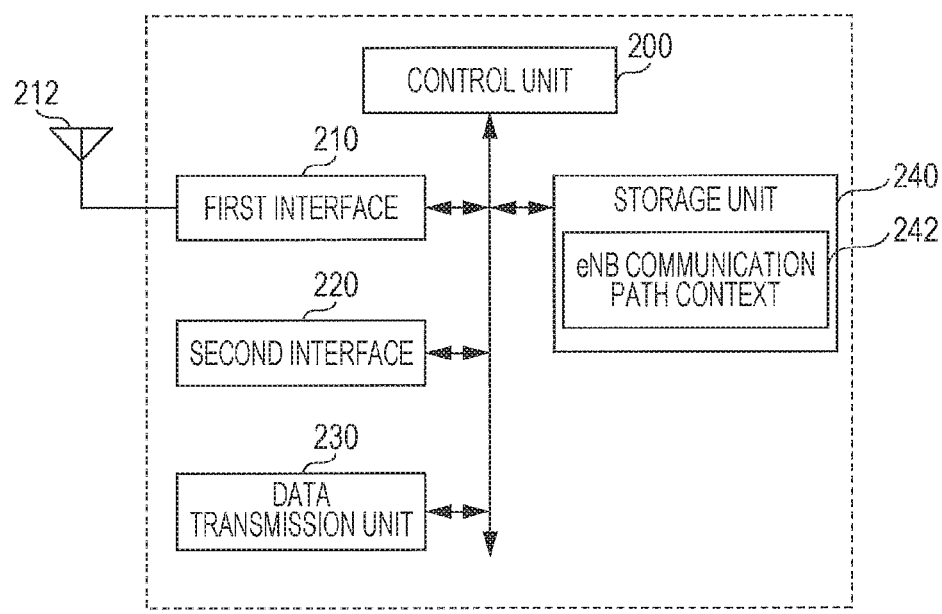
FIG. 4 is a diagram for describing a functional structure of an eNB according to the embodiment.

A functional structure of the eNB 20 according to the present embodiment is illustrated based on FIG. 4. In the eNB 20, a first interface 210, a second interface 220, a data transmission unit 230, and a storage unit 240 are connected to a control unit 200 through a bus.

The control unit 200 is a functional unit for controlling the eNB 20. The control unit 200 realizes various processes by reading various information items or various programs stored in the storage unit 240 and executing the read information items and programs.

The first interface 210 is a functional unit that establishes a radio communication path with another communication terminal such as the UE-R 15 or the UE 10 by the LTE access scheme, and performs the transmission and reception of data through wireless communication. An external antenna 212 is connected to the first interface 210.

The second interface 220 is connected to the core network 7 through wired connection. The connection to the core network 7 may be connection using Ethernet (registered trademark) or an optical fiber cable.

The storage unit 240 is a functional unit that stores programs or data required in various operations of the eNB 20. For example, the storage unit 240 is realized using a semiconductor memory, or a hard disk drive (HDD). The storage unit 240 stores an eNB communication path context 242.

The eNB communication path context 242 is an information group stored in association with a communication path established with the UE-R 15 or the UE 10, and may include an access point name (APN), a bearer ID, a PDN connection ID, a Tunnel Endpoint Identifier (TEID), base station identification information, service identification information, and group identification information.

The access point name (APN) is identification information used to select the PGW 50 in the IP mobile communication network 5, and is identification information associated with the PDN 80. In a case where a different PDN 80 is associated with each service such as IMS or image distribution, the APN may be used as identification information for identifying a service.

The bearer ID is information for identifying a radio bearer which is a radio communication path between the UE 10 and the UE-R 15, which is established when the UE 10 is connected to the UE-R 15. In a case where the UE 10 is connected to the eNB 20, the bearer ID may be information for identifying a radio bearer which a radio communication path between the UE 10 and the eNB 20, which is established when the UE 10 is connected to the eNB 20.

The PDN connection ID is information for identifying PDN connection which is a logical path established by the UE 10 with the PGW 50.

The TEID is identification information of a tunnel communication path for delivering user data, which constitutes the PDN connection, and may be identification information of a tunnel communication path established based on a GTP protocol, a Mobile IP protocol, or a Proxy Mobile IP protocol.

The base station identification information may be information for identifying the UE-R 15, or may be information for identifying the eNB 20. The base station identification information may be obtained by combining a provider identification code for identifying the mobile communication provider that provides the communication service with a base station identification code. Accordingly, the base station identification information may be used as unique identification information in a plurality of mobile communication networks provided by a plurality of mobile communication providers.

The service identification information is information for identifying a service provided by the mobile communication provider in the IP communication network 5. The service identification information may be an APN, or may be service domain identification information such as a fully qualified domain name (FQDN). The service identification information is not limited to the above-described examples, and may be identification information associated with the service. The service may be a voice communication service based on the IMS or a video distribution service, or may be a service that provides group communication. The service identification information is identification information for identifying such services.

The group identification information may be information for identifying a group when two or more communication terminals constitute the group and communication is performed between the groups. In a case where a plurality of contents is delivered to the group, the group identification information may be information for identifying these contents. For example, the group identification information may be information for identifying the terminal group when a simultaneous phone call is performed between the plurality of communication terminals. Alternatively, the group identification information may be information for identifying a session for the phone call. Alternatively, when image distribution is performed to the plurality of communication terminals, the group identification information may be identification information for identifying the terminals that receives the image distribution as the group, or may be identification information for identifying the distributed image in a case where there are plurality of images.

The group identification information may be an IP multicast address, or may be a temporary mobile subscriber identify (TMSI) which is a temporary ID which is assigned by the communication provider and is used to authenticate a user. The group identification information is not limited to the above-described examples, and may be information, such as a mail address, for identifying the group.

The eNB communication path context 242 may be retained for each communication path. For example, a communication path established with the UE-R 15 and a communication path with another communication terminal having the relay function may be respectively retained.

Here, the base station information of the communication path context with respect to the direct communication path may store information for identifying the UE-R 15 and information for identifying the eNB 20.

The data transmission unit 230 is a functional unit that transmits reception data from the UE-R 15, which is received through the first interface 210, to the IP mobile communication network through the second interface 220, and transmits reception data addressed to the UE 10, which is received through the second interface 220, to the UE 10 via the UE-R 15 by the first interface 210.

[1.2.4 Structure of MME]

Figure 5:
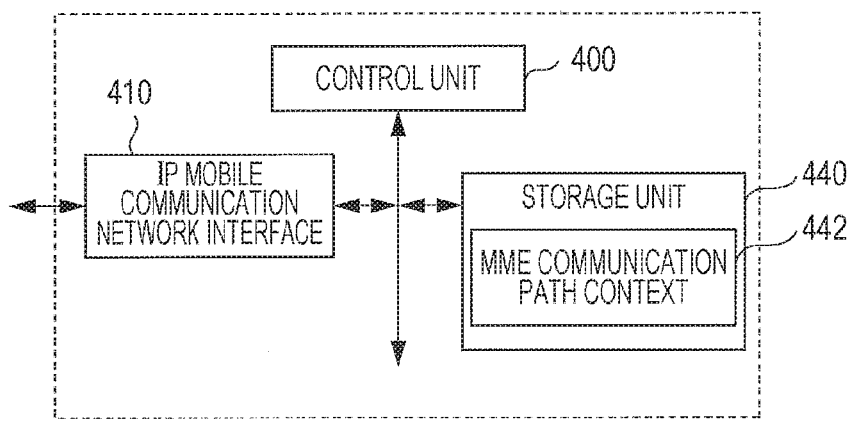
FIG. 5 is a diagram for describing a functional structure of an MME according to the embodiment.

The MME 30 is a control apparatus that determines whether or not permit the service providing or communication path establishment of the UE 10. FIG. 5 shows a functional structure of the MME 30. In the MME 30, an IP mobile communication network interface 410, and a storage unit 440 are connected to a control unit 400 through a bus.

The control unit 400 is a functional unit for controlling the MME 30. The control unit 400 realizes various processes by reading various programs stored in the storage unit 440 and executing the read programs.

The IP mobile communication network interface 410 is a functional unit for allowing the MME 30 to be connected to the IP mobile communication network 5.

The storage unit 440 is a functional unit that stores programs or data required in various operations of the MME 30. For example, the storage unit 440 is realized using a semiconductor memory or a hard disk drive (HDD). The storage unit 440 stores an MME communication path context 442.

The MME communication path context 442 is an information group stored in association with a direct communication path established with the UE-R 15 or the UE 10, and may include an access point name (APN), a bearer ID, a PDN connection ID, a Tunnel Endpoint Identifier (TED), base station identification information, service identification information, and group identification information.

The access point name (APN) is identification information used to select the PGW 50 in the IP mobile communication network 5, and is identification information associated with the PDN 80. In a case where a different PDN 80 is associated with each service such as IMS or image distribution, the APN may be used as identification information for identifying a service.

The bearer ID is information for identifying a radio bearer which is a radio communication path between the UE 10 and the UE-R 15, which is established when the UE 10 is connected to the UE-R 15. In a case where the UE 10 is connected to the eNB 20, the bearer ID may be information for identifying a radio bearer which a radio communication path between the UE 10 and the eNB 20, which is established when the UE 10 is connected to the eNB 20.

The PDN connection ID is information for identifying PDN connection which is a logical path established by the UE 10 with the PGW 50.

The TEID is identification information of a tunnel communication path for delivering user data, which constitutes the PDN connection, and may be identification information of a tunnel communication path established based on a GTP protocol, a Mobile IP protocol, or a Proxy Mobile IP protocol.

The base station identification information may be information for identifying the UE-R 15, or may be information for identifying the eNB 20. The base station identification information may be obtained by combining a provider identification code for identifying the mobile communication provider that provides the communication service with a base station identification code. Accordingly, the base station identification information may be used as unique identification information in a plurality of mobile communication networks provided by a plurality of mobile communication providers.

The service identification information is information for identifying a service provided by the mobile communication provider in the IP communication network 5. The service identification information may be an APN, or may be service domain identification information such as a fully qualified domain name (FQDN). The service identification information is not limited to the above-described examples, and may be identification information associated with the service. The service may be a voice communication service based on the IMS or a video distribution service, or may be a service that provides group communication. The service identification information is identification information for identifying such services.

The group identification information may be information for identifying a group when two or more communication terminals constitute the group and communication is performed between the groups. In a case where a plurality of contents is delivered to the group, the group identification information may be information for identifying these contents. For example, the group identification information may be information for identifying the terminal group when a simultaneous phone call is performed between the plurality of communication terminals. Alternatively, the group identification information may be information for identifying a session for the phone call. Alternatively, when image distribution is performed to the plurality of communication terminals, the group identification information may be identification information for identifying the terminals that receives the image distribution as the group, or may be identification information for identifying the distributed image in a case where there are plurality of images.

The group identification information may be an IP multicast address, or may be a temporary mobile subscriber identify (TMSI) which is a temporary ID which is assigned by the communication provider and is used to authenticate a user. The group identification information is not limited to the above-described examples, and may be information, such as a mail address, for identifying the group.

The MME communication path context 442 may be retained for each communication path. For example, the MME communication path context may be retained for each of the communication path established by the UE 10 with the UE-R 15 and the communication path established by the UE with another communication terminal having the relay function.

Here, the base station information of the communication path context with respect to the direct communication path may be information for identifying the UE-R 15, and information for identifying the eNB 20 to which the UE-R 15 is connected.

[1.2.5 Structure of ProSe Server]

Figure 6:
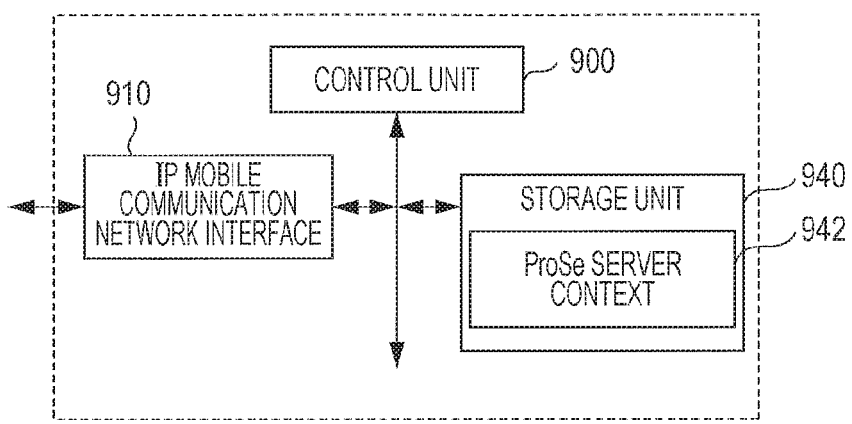
FIG. 6 is a diagram for describing a functional structure of a ProSe Server according to the embodiment.

FIG. 6 shows a functional structure of the ProSe Server 90. In the ProSe Server 90, an IP mobile communication network interface 910, and a storage unit 940 are connected to a control unit 900 through a bus.

The control unit 900 is a functional unit for controlling the ProSe Server 90. The control unit 900 realizes various processes by reading various programs stored in the storage unit 940 and reading the read programs.

The IP mobile communication network interface 910 is a functional unit for allowing the ProSe Server 90 to be connected to the IP mobile communication network 5.

The storage unit 940 is a functional unit that stores programs or data required in various operations of the ProSe Server 90. For example, the storage unit 940 is realized using a semiconductor memory or a hard disk drive (HDD).

The storage unit 940 stores a ProSe Server communication path context 942.

The ProSe Server communication path context 942 is an information group stored in association with a direct communication path established with the UE-R 15 or the UE 10, and may include an access point name (APN), a bearer ID, a PDN connection ID, a Tunnel Endpoint Identifier (TEID), base station identification information, service identification information, and group identification information.

The access point name (APN) is identification information used to select the PGW 50 in the IP mobile communication network 5, and is identification information associated with the PDN 80. In a case where a different PDN 80 is associated with each service such as IMS or image distribution, the APN may be used as identification information for identifying a service.

The bearer ID is information for identifying a radio bearer which is a radio communication path between the UE 10 and the UE-R 15, which is established when the UE 10 is connected to the UE-R 15. In a case where the UE 10 is connected to the eNB 20, the bearer ID may be information for identifying a radio bearer which a radio communication path between the UE 10 and the eNB 20, which is established when the UE 10 is connected to the eNB 20.

The PDN connection ID is information for identifying PDN connection which is a logical path established by the UE 10 with the PGW 50.

The TEID is identification information of a tunnel communication path for delivering user data, which constitutes the PDN connection, and may be identification information of a tunnel communication path established based on a GTP protocol, a Mobile IP protocol, or a Proxy Mobile IP protocol.

The base station identification information may be information for identifying the UE-R 15, or may be information for identifying the eNB 20. The base station identification information may be obtained by combining a provider identification code for identifying the mobile communication provider that provides the communication service with a base station identification code. Accordingly, the base station identification information may be used as unique identification information in a plurality of mobile communication networks provided by a plurality of mobile communication providers.

The service identification information is information for identifying a service provided by the mobile communication provider in the IP communication network 5. The service identification information may be an APN, or may be service domain identification information such as a fully qualified domain name (FQDN). The service identification information is not limited to the above-described examples, and may be identification information associated with the service. The service may be a voice communication service based on the IMS or a video distribution service, or may be a service that provides group communication. The service identification information is identification information for identifying such services.

The group identification information may be information for identifying a group when two or more communication terminals constitute the group and communication is performed between the groups. In a case where a plurality of contents is delivered to the group, the group identification information may be information for identifying these contents. For example, the group identification information may be information for identifying the terminal group when a simultaneous phone call is performed between the plurality of communication terminals. Alternatively, the group identification information may be information for identifying a session for the phone call. Alternatively, when image distribution is performed to the plurality of communication terminals, the group identification information may be identification information for identifying the terminals that receives the image distribution as the group, or may be identification information for identifying the distributed image in a case where there are plurality of images.

The group identification information may be an IP multicast address, or may be a temporary mobile subscriber identify (TMSI) which is a temporary ID which is assigned by the communication provider and is used to authenticate a user. The group identification information is not limited to the above-described examples, and may be information, such as a mail address, for identifying the group.

The ProSe Server communication path context 942 may be retained for each communication path. For example, The ProSe Server communication path context 942 may be retained for each of the communication path established by the UE 10 with the UE-R 15 and the communication path established by the UE with another communication terminal having the relay function.

Here, the base station information of the communication path context with respect to the direct communication path may store information for identifying the UE-R 15 and information for identifying the eNB 20 to which the UE-R 15 is connected.

[1.3 Description of Process]

Hereinafter, an example of a specific process in the above-described mobile communication system will be described. The present example includes a procedure of causing the UE 10 to be connected to the UE-R 15, a procedure of causing the UE-R 15 to be connected to the IP mobile communication network 5, and a procedure of causing the UE 10 to establish a communication path via the UE-R 15. In the following description, LTE Direct of establishing a direct communication path between the UE 10 and the UE-R 15 by using the LTE communication method is described as LTE(D).

[1.3.1 UE Connection Procedure]

Figure 7:
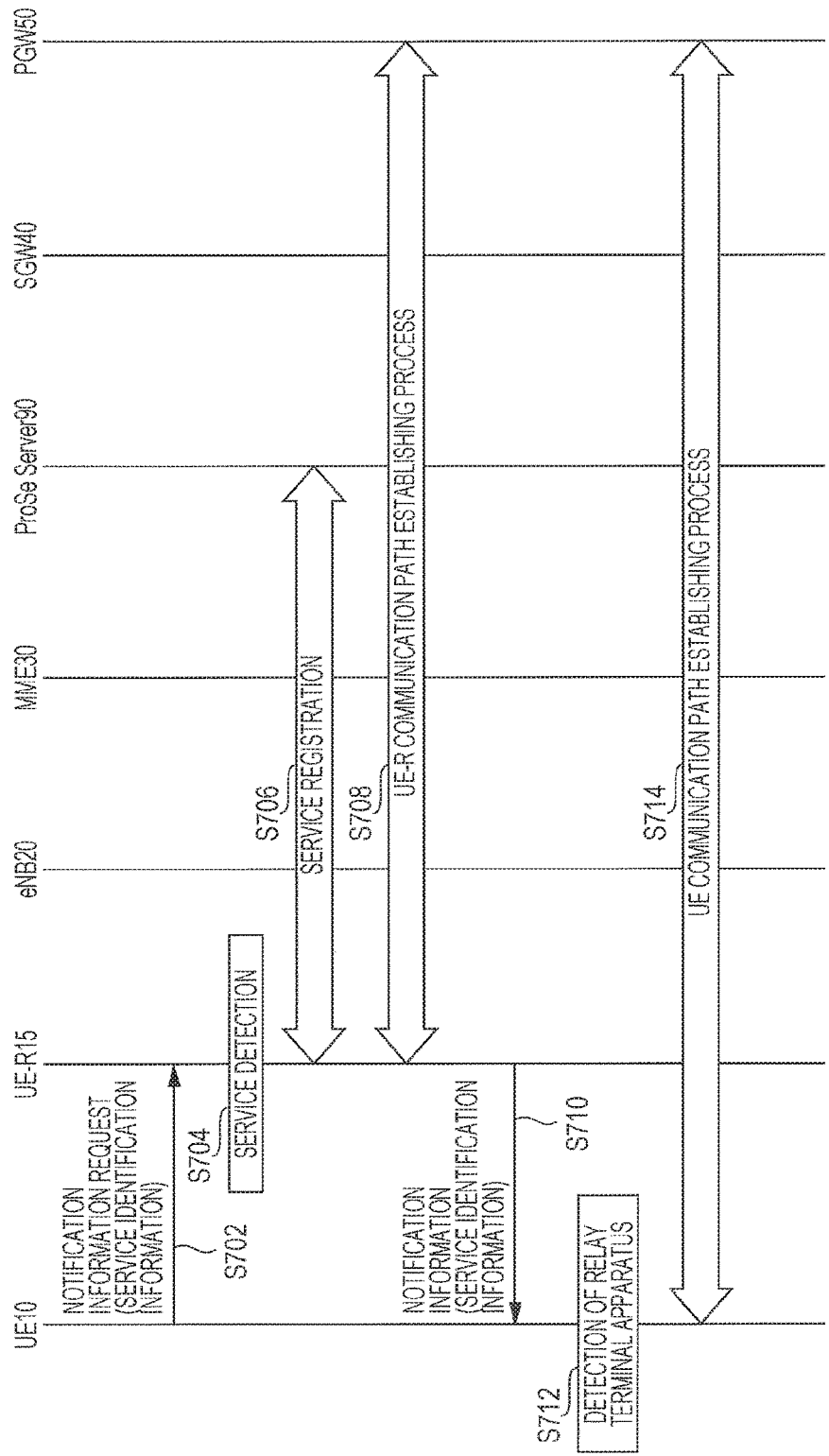
FIG. 7 is a diagram for describing a UE connection procedure according to the first embodiment.

An example of the connection procedure of causing the UE 10 to be connected to the UE-R 15 will be described with reference to FIG. 7. The UE 10 may start the procedure by using the detection that the eNB 20 is present outside of coverage enough not to be detected as a trigger. The UE 10 may detect the eNB 20, and may be connected to the IP mobile communication network via the eNB 20 based on the procedure of the related art. The procedure may be started through a terminal operation for starting a service by the user. For example, the procedure may be started by a user operation for starting group communication. Initially, if it is detected that the procedure is started by the above-described method, the UE 10 transmits a notification information request message to the UE-R 15 (S702). The notification information request message is transmitted in order to detect the UE-R 15 positioned in proximity. The notification information request may be transmitted in a broadcast manner, or identification information of the UE-R 15 may be previously retained and may be transmitted to the UE-R 15 in a unicast manner. The notification information request message may include identification information of the UE 10, an access point name (APN), service identification information, and group identification information.

The access point name (APN) is identification information used to select the PGW 50 in the IP mobile communication network 5, and is identification information associated with the PDN 80. In a case where a different PDN 80 is associated with each service such as IMS or image distribution, the APN may be used as identification information for identifying a service.

The service identification information is information for identifying a service provided by the mobile communication provider in the IP communication network 5. The service identification information may be an APN, or may be service domain identification information such as a fully qualified domain name (FQDN). The service identification information is not limited to the above-described examples, and may be identification information associated with the service. The service may be a voice communication service based on the IMS or a video distribution service, or may be a service that provides group communication. The service identification information is identification information for identifying such services.

The group identification information may be information for identifying a group when two or more communication terminals constitute the group and communication is performed between the groups. In a case where a plurality of contents is delivered to the group, the group identification information may be information for identifying these contents. For example, the group identification information may be information for identifying the terminal group when a simultaneous phone call is performed between the plurality of communication terminals. Alternatively, the group identification information may be information for identifying a session for the phone call. Alternatively, when image distribution is performed to the plurality of communication terminals, the group identification information may be identification information for identifying the terminals that receives the image distribution as the group, or may be identification information for identifying the distributed image in a case where there are plurality of images.

The group identification information may be an IP multicast address, or may be a temporary mobile subscriber identify (TMSI) which is a temporary ID which is assigned by the communication provider and is used to authenticate a user. The group identification information is not limited to the above-described examples, and may be information, such as a mail address, for identifying the group. The UE-R 15 receives the notification information request, and performs service detection (S704). The service detection may be performed based on the identification information of the UE 10 included in the notification information request message, the access point name (APN), the service identification information and the group identification information. For example, The UE-R 15 may detect whether or not an APN received from the UE 10 is a service capable of being provided by previously retaining the association of a service capable of being provided to the UE 10 with an APN associated with the service. The UE-R 15 may detect whether or not service identification information received from the UE 10 is a service capable of being provided by previously retaining the association of a service capable of being provided to the UE 10 with service identification information associated with the service. It may be detected whether or not group identification information received from the UE 10 is a service capable of being provided by previously retaining the association of a service capable of being provided to the UE 10 with group identification information associated with the service.

The service detection may be performed based on any combination of the APN, the service identification information and the group identification information.

The UE-R 15 may perform a service registration procedure in the ProSe Server 90 (S706), and may detect whether or not the service is a service capable of being provided to the UE 10 based on this result.

The UE-R 15 registers a service provided to the UE 10 in the ProSe Server 90. The service registration procedure will be described in detail below.

After the service is detected, the UE-R 15 may select the PGW 50 depending on the service, and may establish a communication path with the PGW 50 by performing a UE-R communication path establishing process (S708). Specifically, the UE-R 15 establishes PDN connection with the PGW 50. In the UE-R communication path establishing procedure, the establishment procedure may be started by transmitting an establishment request message to the IP communication network based on the service detection.

More specifically, a communication path is established by transmitting a PDN connection establishing request message to the MME 30 and receiving a response message that permits the establishment of the PDN connection, as a response to the PDN connection establishing request message.

The PDN connection establishing request message may include the identification information of the UE 10, the access point name (APN), the service identification information and the group identification information.

The response message may include the access point name (APN), the bearer ID, the PDN connection ID, the Tunnel Endpoint Identifier (TEID), the base station identification information, the service identification information, and the group identification information, and the UE-R communication path context may be retained based on the response message. The UE-R 15 may manage the UE-R communication path context and the established communication path such that these information items are associated with each other.

The selection of the PGW 50 may be performed by previously retaining the PGW 50 associated with the service. The MME 30 may previously retain the PGW 50 associated with the service, and the PGW 50 may transmit control information for inquiring of the MME 30. Thus, information of the PGW 50 may be obtained by this response.

In a case where the detection of the service, the registration of the service and the establishment of the PDN connection associated with the service are completed, the UE-R 15 transmits the notification information to the UE 10 (S710). The notification information may be transmitted in a broadcast manner, or the identification information of the UE 10 may be previously retained and may be transmitted to the UE 10 in a unicast manner. The notification information message may include the identification information of the UE 10, the access point name (APN), the service identification information, and the group identification information.

Accordingly, the UE-R 15 can notify a service capable of being provided to the UE 10 by transmitting the notification information.

The UE-R 15 may transmit the notification information message by adding load information to the notification information message. The load information may be information regarding a load indicating a processing state of the UE-R 15, may be the number of connected communication terminals, or may be processing load information in a case where the relay processes of the plurality of terminals are performed. The load information may be class information indicating a processing load.

The UE-R 15 may cancel the relay function in a case where the relay process is not performed. The relay function may be valid based on the reception of the notification information request message. The relay function may be valid based on the fact that the service can be detected.

The notification information request transmitted from the UE 10 may be received by another terminal apparatus having the relay function in addition to the UE-R 15, and each terminal apparatus may perform the detection of the service, the registration of the service and the establishment of the communication path and may transmit the notification information, similarly to the UE-R 15.

The UE 10 receives the notification information, and detects the UE-R 15 capable of providing the service (S712).

The detection of the UE-R capable of providing the service may be performed by selecting and detecting the relay terminal apparatus based on the identification information included in the notification information message, the access point name (APN), the service identification information and the group identification information. For example, it may be detected whether or not an APN received by the UE 10 is a necessary service by previously retaining the association of a service capable of being provided to the UE 10 with an APN associated with the service. It may be detected whether or not service identification information received by the UE 10 is a necessary service by previously retaining the association of the a service capable of being provided to the UE 10 with service identification information associated with the service. It may be detected whether or not group identification information received by the UE 10 is a necessary service by previously retaining the association of a service capable of being provided to the UE 10 with group identification information associated with the service.

The UE 10 may receive the notification information from the UE-R 15, and may receive the notification information from another terminal apparatus having the relay function.

In a case where a plurality of notification information items is received, a connection destination may be selected based on the identification information, the access point name (APN), the service identification information and the group identification information included in the notification information message included in each notification information item.

As stated above, the selection of the terminal apparatus having the relay function may be performed based on the provided service.

In a case where there is a plurality of terminal apparatuses having the relay function which provides the service required by the UE 10, the connection destination may be selected based on the load information included in each notification information item.

Accordingly, the UE 10 can select the terminal apparatus having the relay function, which has a less load. In the terminal apparatuses having the relay function, it is possible to distribute the terminals to be connected, and thus, it is possible to reduce excessive unequal distribution. As a result, it is possible to optimize the processing load.

The UE 10 may select the UE-R 15 immediately after the notification information is received, or may execute a timer to maintain a reception state of the notification information for a predetermined period of time, and may wait for the notification information from another terminal apparatus.

The period of time during which the timer is executed may be previously retained, or the UE-R 15 may transmit the notification information including a value determined based on a policy of the communication provider.

As stated above, the UE 10 can select an optimum relay terminal apparatus, among the relay terminal apparatuses capable of being connected, based on the group identification information of the group communication or the service required by the UE 10.

The UE 10 may determine to select the identification information of the group communication and the identification information of the service required by the UE based on any information associated with the service or the group, such as the APN, the IP multicast address, the TMSI and the FQDN which are notified from the IP communication network 5, or a combination of these information items. The UE 10 may select the relay terminal apparatus based on the determination result.

In the present embodiment, an example in which the UE 10 selects the UE-R 15 will be described. The UE 10 selects the UE-R 15, and performs a UE communication path establishing process to establish a communication path (S714). In the UE communication path establishing process, the UE 10 transmits an establishment request message based on the detection of the UE-R, and starts an establishment procedure.

More specifically, the UE may establish the communication path by transmitting the PDN connection establishing request message to the MME 30 via the UE-R 15 and receiving the response message that permits the establishment of the PDN connection, as a response to the PDN connection establishing request message.

The UE may establish the communication path by transmitting the PDN connection establishing request message to the UE-R 15 and receiving the response message that permits the establishment of the PDN connection, as a response to the PDN connection establishing request message.

The PDN connection establishing request message may include the identification information of the UE 10, the access point name (APN), the service identification information, and the group identification information.

The response message may include the access point name (APN), the bearer ID, the PDN connection ID, the Tunnel Endpoint Identifier (TEID), the base station identification information, the service identification information and the group identification information, or retain the UE communication path context based on the response message. The response message including information such as an IP address or Quality of Service (QoS) information may be transmitted. The UE 10 may manage the UE communication path context and the established communication path such that these items are associated with each other.

The UE-R 15 may transmit the response message to the UE 10 based on the permission information of the communication path establishment of the MME 30 or the ProSe Server 90.

The MME 30 may transmit the response message to the UE 10. The ProSe Server 90 may transmit the response message to the UE 10.

The UE-R 15 may obtain the access point name (APN), the bearer ID, the PDN connection ID, the Tunnel Endpoint Identifier (TEID), the base station identification information, the service identification information, the group identification information, the IP Address and the QoS information, which are determined or assigned based on the determination of the establishment permission of the PDN connection of the MME 30 or the ProSe Server 90, as the response to the PDN connection establishing request message transmitted from the UE 10. Any one of the eNB 20, the MME 30, the ProSe Server 90 and the SGW 40 may transmit the response to the UE-R 15. The UE-R 15 may obtain and retain the received information group as the information of the context.

The UE 10 may establish the direct communication path with the UE-R 15 based on the LTE(D), and the UE-R 15 may manage the communication path established in the UE-R communication path establishing process and the communication path established in the UE communication path establishing process, and may perform a relay process.

More specifically, the UE-R communication path contexts of the respective communication paths may be retained so as to be associated, and the UE 10 may transmit data transmitted to the UE-R 15 through the communication path established in the UE communication path establishing process to the core network 7 through the communication path established in the UE-R communication path establishing process. The data addressed to the UE 10, which is transmitted from the core network 7 through the communication path established in the UE-R communication path establishing process, may be received, and may be transmitted to the UE 10 through the communication path established in the UE communication path establishing process.

Through the above-described procedure, the UE 10 can select the UE-R 15 from the plurality of communication terminals having the relay function, and can establish the communication path via the UE-R 15. The UE 10 can start the transmission and reception of data to and from the PDN 80 by the transmission process of the UE-R 15.

[1.3.1.1 Service Registration Procedure]

Figure 9:
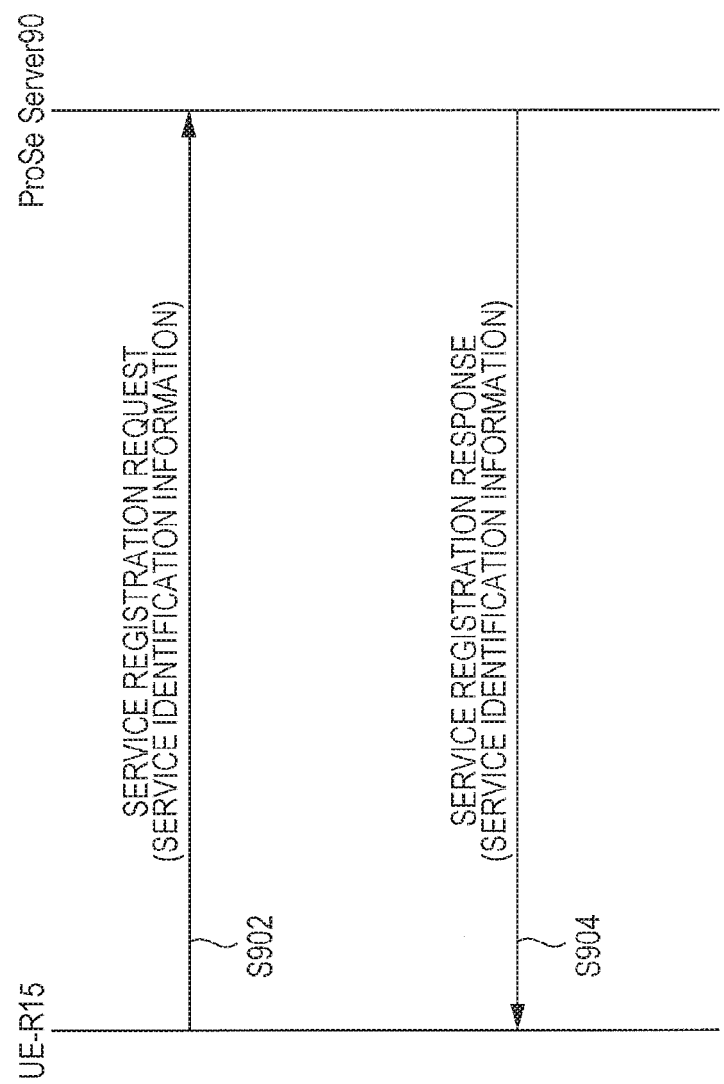
FIG. 9 is a diagram for describing a service registration procedure.

A specific procedure of the service registration procedure (S706) described with reference to FIG. 7 will be described with reference to FIG. 9.

The UE-R 15 transmits a service registration request to the ProSe Server 90, and requests to register a service provided to the terminal apparatus connected with the UE-R through the direct communication path (S902). As described with reference to FIG. 7, the service registration request message may be transmitted using the reception of the notification information request message transmitted by the UE 10 as a trigger. The message may include the identification information of the UE 10, an access point name (APN), service identification information, and group identification information.

The access point name (APN) is identification information used to select the PGW 50 in the IP mobile communication network 5, and is identification information associated with the PDN 80. In a case where a different PDN 80 is associated with each service such as IMS or image distribution, the APN may be used as identification information for identifying a service.

The service identification information is information for identifying a service provided by the mobile communication provider in the IP communication network 5. The service identification information may be an APN, or may be service domain identification information such as a fully qualified domain name (FQDN). The service identification information is not limited to the above-described examples, and may be identification information associated with the service. The service may be a voice communication service based on the IMS or a video distribution service, or may be a service that provides group communication. The service identification information is identification information for identifying such services.

The group identification information may be information for identifying a group when two or more communication terminals constitute the group and communication is performed between the groups. In a case where a plurality of contents is delivered to the group, the group identification information may be information for identifying these contents. For example, the group identification information may be information for identifying the terminal group when a simultaneous phone call is performed between the plurality of communication terminals. Alternatively, the group identification information may be information for identifying a session for the phone call. Alternatively, when image distribution is performed to the plurality of communication terminals, the group identification information may be identification information for identifying the terminals that receives the image distribution as the group, or may be identification information for identifying the distributed image in a case where there are plurality of images.

The group identification information may be an IP multicast address, or may be a temporary mobile subscriber identify (TMSI) which is a temporary ID which is assigned by the communication provider and is used to authenticate a user. The group identification information is not limited to the above-described examples, and may be information, such as a mail address, for identifying the group. The ProSe Server 90 receives the service registration request message, determines whether or not to permit the service provided by the UE-R 15, transmits the service registration response as the response message, and notifies of the result by adding a flag for notifying the determination result of the permission or non-permission to the service response registration response (S904). The service response registration response may include the identification information of the UE 10, the access point name (APN), the service identification information, and the group identification information in addition to the information of the permission or non-permission.

[1.3.1.2 Modification Example of Service Registration Procedure]

Unlike the method described in 1.3.1.2 Service Registration Procedure, the UE-R 15 may transmit the service registration request message to the ProSe Server 90 without previously retaining the service capable of being provided by the UE-R 15 and without previously retaining the service registration request message. The UE-R 15 may inquire of the ProSe Server 90 about the service to be provided. The ProSe Server 90 may notify of the service provided by the UE-R 15. The transmission and reception of the service registration request message, the information elements of the transmission and reception of the service registration response message and the transmission and reception methods are the same as those described in 1.3.1.1 Service Registration Procedure, and thus the detailed description thereof will be omitted.

[1.3.2 UE-R Communication path Establishing Process]

Figure 10:
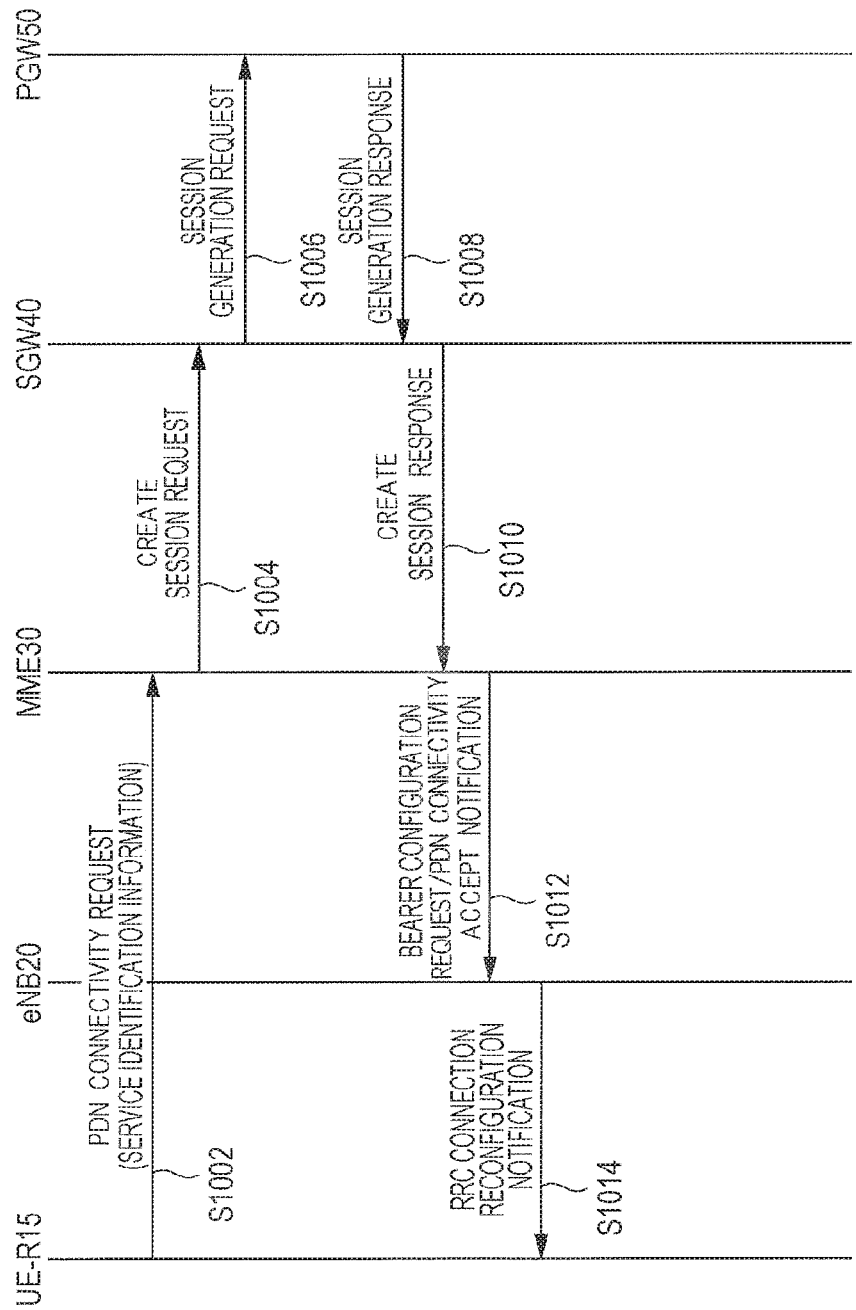
FIG. 10 is a diagram for describing a UE-R communication path establishing procedure.

An example of the UR-R communication path establishing process (S708) described with reference to FIG. 7 in 1.3.1 UE Connection Procedure will be described with reference to FIG. 10.

After the service is detected, the UE-R may select the PGW 50 depending on the service, and may perform the UE-R communication path establishing process to request the communication path establishment with the PGW 50.

The UE-R 15 transmits the PDN connectivity request to the MME 30, and requests the PDN connection establishment (S1002).

The PDN connectivity request may include information for identifying the UE-R 15 such as an International Mobile Subscriber Identity (IMSI), an APN, service identification information, and group identification information.

The service identification information is information for identifying a service provided by the mobile communication provider in the IP communication network 5. The service identification information may be an APN, or may be service domain identification information such as a fully qualified domain name (FQDN). The service identification information is not limited to the above-described examples, and may be identification information associated with the service. The service may be a voice communication service based on the IMS or a video distribution service, or may be a service that provides group communication. The service identification information is identification information for identifying such services.

The group identification information may be information for identifying a group when two or more communication terminals constitute the group and communication is performed between the groups. In a case where a plurality of contents is delivered to the group, the group identification information may be information for identifying these contents. For example, the group identification information may be information for identifying the terminal group when a simultaneous phone call is performed between the plurality of communication terminals. Alternatively, the group identification information may be information for identifying a session for the phone call. Alternatively, when image distribution is performed to the plurality of communication terminals, the group identification information may be identification information for identifying the terminals that receives the image distribution as the group, or may be identification information for identifying the distributed image in a case where there are plurality of images.

The group identification information may be an IP multicast address, or may be a temporary mobile subscriber identify (TMSI) which is a temporary ID which is assigned by the communication provider and is used to authenticate a user. The group identification information is not limited to the above-described examples, and may be information, such as a mail address, for identifying the group.

The UE-R 15 may receive the notification information from the eNB 20, and may transmit the PDN connectivity request based on the received notification information. For example, the eNB 20 may transmit the notification information including the APN, the service identification information and the group identification information which are described above, and the UE-R 15 may receive the APN, the service identification information and the group identification information from the notification information and may add the received information items to the PDN connectivity request. As mentioned above, the UE-R 15 may obtain information regarding group communication or a service capable of being provided by the UE-R 15 from the notification information. The UE-R 15 may previously retain such information.

As stated above, the UE-R 15 may establish the communication path corresponding to the group communication or the service provided to the terminal apparatus connected to the UE-R 15.

The MME 30 receives the PDN connectivity request, and determines whether or not to permit the service for the UE-R 15.

In a case where the service is permitted, the MME 30 transmits a create session request to the SGW 40 (S 1004). The MME 30 may select the SGW 40 and may select the PGW 50.

The SGW 40 receives the create session request from the MME 30, and transmits the create session request to the PGW 50 in response to the reception (S 1006). Here, the SGW 40 may obtain the selected PGW 50 of the MME 30, and may determine the PGW 50 as a transmission destination.

The PGW 50 receives the create session request from the SGW 40, and transmits a create session response to the SGW 40 (S 1008). Here, the PGW 50 may assign a bearer ID, a PDN connection ID, a TED, and an IP address notified to the UE-R 15, and may add these items to the create session response.

The SGW 40 may receive the session response from the PGW 50, and may transmit the create session response to the MME 30 (S1010). The SGW 40 may add the received bearer ID, PDN connection ID, TEID and IP address notified to the UE-R 15 to the create session response. The assignment of the bearer ID, PDN connection ID and TEID may be performed by the SGW 40, and these items may be transmitted while being added to the create session response.

The MME 30 may receive the create session response from the SGW 40, and may transmit bearer configuration request/PDN connectivity accept notification to the eNB 20 (S1012). The bearer configuration request/PDN connectivity accept notification may include the bearer ID, the PDN connection ID, the TEID, and the IP address notified to the UE-R 15. Here, the MME 30 may generate the MME communication path context 442 associated with the PDN connection established between the UE-R 15 and the PGW 50 based on the information included in the create session response.

The APN, the bearer ID, the PDN connection ID and the TED may be obtained from the create session response and may be retained. These items may be assigned by the MME 30. As the base station identification information, the information of the eNB 20 to which the UE-R 15 is connected may be obtained and retained. As the service identification information and the group identification information, the information which is included in the PDN connectivity request and is transmitted by the UE-R 15 may be obtained and retained.

The eNB 20 may receive the bearer configuration request/PN connectivity accept notification, and may transmit RRC connection reconfiguration notification to the UE-R 15 (S1014). Here, the eNB 20 may generate the eNB communication path context 242 associated with the PDN connection established between the UE-R 15 and the PGW 50 based on the information included in the received control information.

The APN, the bearer ID, the PDN connection ID and the TED may be obtained from the bearer configuration request/PN connectivity accept notification and may be retained. The assignment of these items is not limited to the above-described examples, and may be assigned by the eNB 20 and may be retained. As the base station identification information, own identification information of the eNB 20 may be retained. As the service identification information and the group identification information, the information which is included in the PDN connectivity request and is transmitted by the UE-R 15 may be obtained and retained. These information items may be obtained using the control information from the UE-R 15, or may be obtained from the MME 30. The ProSe Server 90 may manage the service identification information and the group identification information associated with the UE-R 15, and the eNB 20 may obtain these information items by inquiring of the ProSe 90 and receiving the notification. The RRC connection configuration notification may include the bearer ID, the PDN connection ID, the TED and the IP address notified to the UE-R 15. The UE-R 15 receives RRC connection reconfiguration notification, and completes the establishment of the PDN connection. The UE-R 15 can perform the communication through the PDN connection by using the obtained IP address. Here, the UE-R 15 may generate the UE-R communication path context 1542 associated with the PDN connection established between the UE-R 15 and the PGW 50 based on the information included in the received control information.

The APN, the bearer ID, the PDN connection ID and the TED may be obtained from the RRC connection reconfiguration notification, and may be retained. The obtaining of these items is not limited to the above-described example, and the UE-R 15 may previously retain these items based on the information included in the PDN connectivity request. As the base station identification information, the identification information of the eNB 20 to which the UE-R 15 is connected may be retained. As the service identification information and the group identification information, the information which is included in the PDN connectivity request and is transmitted by the UE-R 15 may be retained. These items may be obtained using the control information from the eNB 20, or may be obtained from the MME 30. The ProSe Server 90 may manage the identification information of the group communication and the identification information of the service permitted to be provided, and the UE-R 15 may obtain these information items by inquiring of the ProSe 90 and receiving the notification.

As described above, the UE-R 15 can establish the PDN connection with the PGW 50.

The UE-R 15 may obtain the service information associated with the PDN connection and the group information from the ProSe Server 90. The ProSe Server 90 may obtain the information of the MME communication path context from the MME 30, and may generate and retain the ProSe Server communication path context 942.

The communication path context is not limited to the above-described example, and the UE-R 15 may notify the ProSe Server 90 of the generated UR-R communication path context in response to the establishment of the PDN connection. The ProSe Server 90 may generate and retain the ProSe Server communication path context 942 based on the received information.

[1.3.3 UE Communication Path Establishing Process]

Figure 11:
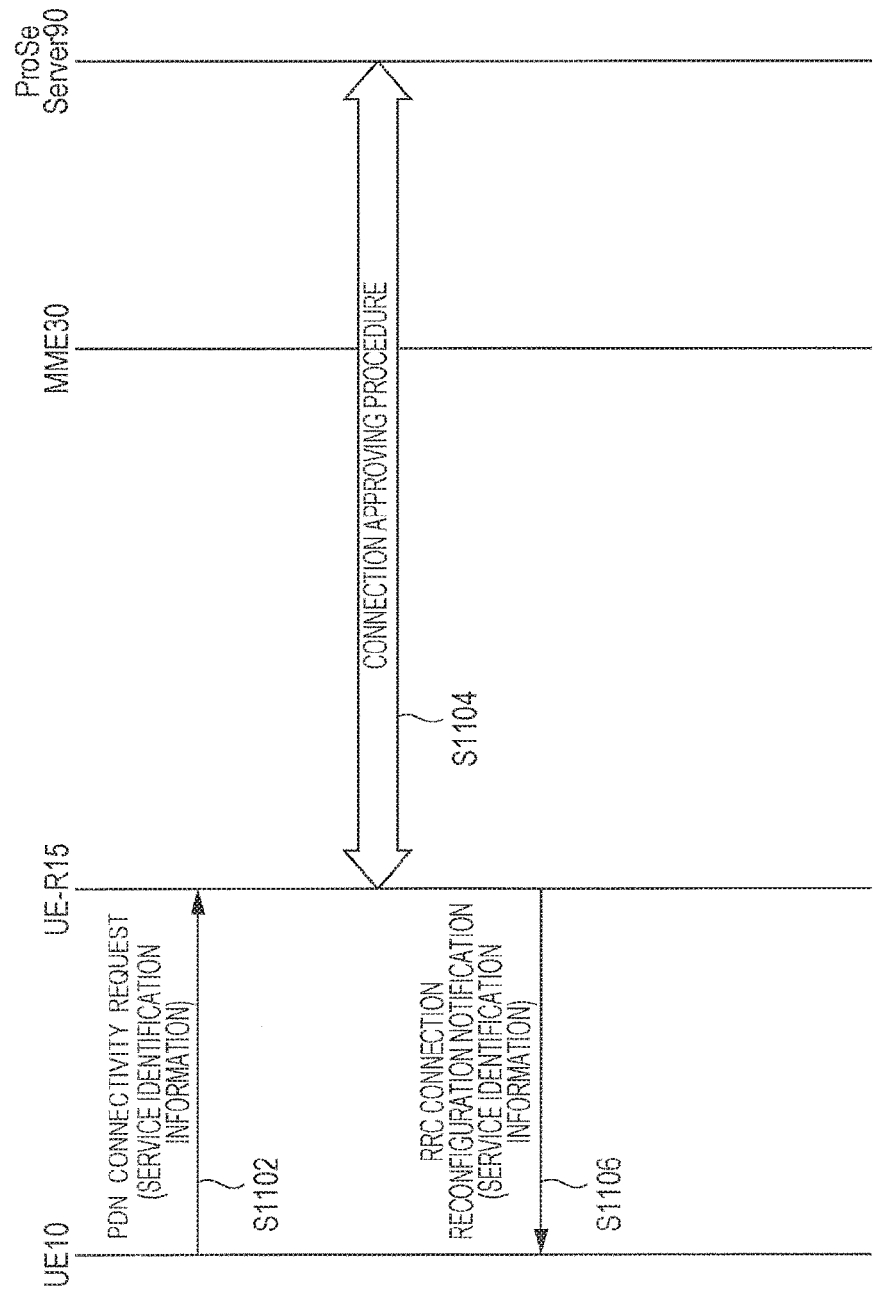
FIG. 11 is a diagram for describing a UE communication path establishing procedure.

An example of the UE communication path establishing process (S714) described with reference to FIG. 7 in 1.3.1 UE Connection Procedure will be described with reference to FIG. 11.

The UE 10 may transmit the PDN connectivity request to the UE-R 15 and may request the communication path establishment (S1102).

The PDN connectivity request may include information for identifying the UE 10 such as an International Mobile Subscriber Identity (IMSI), an APN, service identification information and group identification information.

The service identification information is information for identifying a service provided by the mobile communication provider in the IP communication network 5. The service identification information may be an APN, or may be service domain identification information such as a fully qualified domain name (FQDN). The service identification information is not limited to the above-described examples, and may be identification information associated with the service. The service may be a voice communication service based on the IMS or a video distribution service, or may be a service that provides group communication. The service identification information is identification information for identifying such services.

The group identification information may be information for identifying a group when two or more communication terminals constitute the group and communication is performed between the groups. In a case where a plurality of contents is delivered to the group, the group identification information may be information for identifying these contents. For example, the group identification information may be information for identifying the terminal group when a simultaneous phone call is performed between the plurality of communication terminals. Alternatively, the group identification information may be information for identifying a session for the phone call. Alternatively, when image distribution is performed to the plurality of communication terminals, the group identification information may be identification information for identifying the terminals that receives the image distribution as the group, or may be identification information for identifying the distributed image in a case where there are plurality of images.

The group identification information may be an IP multicast address, or may be a temporary mobile subscriber identify (TMSI) which is a temporary ID which is assigned by the communication provider and is used to authenticate a user. The group identification information is not limited to the above-described examples, and may be information, such as a mail address, for identifying the group.

The UE 10 may receive the notification information from the UE-R 15, and may transmit the PDN connectivity request based on the received notification information. For example, the UE-R 15 may transmit the notification information including the APN, the service identification information and the group identification information which are described above, and the UE 10 may receive the APN, the service identification information and the group identification information from the notification information and may add these items to the PDN connectivity request. As mentioned above, the information regarding the group communication or the service capable of being provided by the UE 10 from the notification information. The UE-R 10 may previously retain such information, and may add the retained information to the PDN connectivity request.

The UE-R 15 receives the PDN connectivity request, and performs a connection Authorization procedure (S1104). In the connection approving procedure, the UE-R communication path context 1542 corresponding to the identification information of the group communication, the service information and the APN included in the PDN connectivity request may be selected, and the PDN connection associated with the UR-R communication path context 1542 may be selected.

The UE-R 15 may perform data transmission using the selected PDN connection as the transmission path of the transmission and reception of data to and from the PDN of the UE 10.

The UE-R 15 may notify the MME 30 of the information of the UE-R communication path context 1542 corresponding to the selected PDN connection, and may register the information of the communication path and the registration of the service provided to the UE 10. The MME 30 may retain the received information in the MME communication path context 342.

The UE-R 15 may notify the ProSe Server 90 of the information of the UE-R communication path context 1542 corresponding to the selected PDN connection, and may register the information of the communication path and the registration of the service provided to the UE 10. The ProSe Server 90 may retain the received information in the ProSe Server communication path context 942.

As mentioned above, the UE-R 15 may establish the connectivity between the UE 10 and the PDN. The UE-R 15 may transmit response to a PDN connectivity request to the UE 10 (S1106). Here, a response control message may be RR connection reconfiguration notification.

The UE-R 15 inquires of the MME 30 or the ProSe Server 90 without registering the context in the MME or the ProSe Server, and thus, the UE-R 15 may obtain the information elements of the UE-R context information 1542, the UE-R 15 may transmit an information request message to the MME 30, and the MME 30 may transmit the information including the identification information of the group communication and the identification information of the service provided to the UE-R 15.

The UE-R 15 may transmit the information request message to the ProSe Server 90, and the ProSe Server 90 may transmit the information including the identification information of the group communication and the identification information of the service provided to the UE-R 15.

The response message may include the bearer ID, the PDN connection ID, the TED and the IP address notified to the UE-R 15.

As the bearer ID, the PDN connection ID, the TEID and the IP address, the information items included in the UE-R communication path context 1542 may be used, or may be newly assigned and notified by the UE-R 15.

The UE 10 receives a response to the PDN connectivity request, and establishes a bearer with the UE-R 15. The connectivity to the PDN may be established by mapping the PDN connection established by the UE-R 15 with the PGW 50 and the bearer established between the UE-R 15 and the UE 10. The UE 10 can perform the transmission and reception of data with the PDN by using the IP address obtained by the PDN connectivity request response. The UE 10 may generate the UE communication path context 142 in response to the reception of the response. The UE 10 may generate the UE context 142 based on the data received by the PDN connectivity request response. The UE 10 may notify the MME 30 of the information of the UE communication path context 142 corresponding to the selected PDN connection, and may register the information of the communication path and the registration of the service provided to the UE 10. The MME 30 may retain the received information in the MME communication path context 342.

The UE 10 may notify the ProSe Server 90 of the information of the UE communication path context 1142 corresponding to the selected PDN connection, and may register the information of the communication path and the registration of the service provided to the UE 10. The ProSe Server 90 may retain the received information in the ProSe Server communication path context 942.

The UE-R 10 inquires of the MME 30 or the ProSe Server 90 without registering the context in the MME or the ProSe Server, and thus, the UE 10 may obtain the information elements of the UE context information 142, the UE 10 may transmit an information request message to the MME 30, and the MME 30 may transmit the information including the identification information of the group communication and the identification information of the service provided to the UE 10.

The UE 10 may transmit the information request message to the ProSe Server 90, and the ProSe Server 90 may transmit the information including the identification information of the group communication and the identification information of the service provided to the UE 10.

[1.3.3.1 Modification Example of UE Communication Path Establishing Process]

Figure 12:
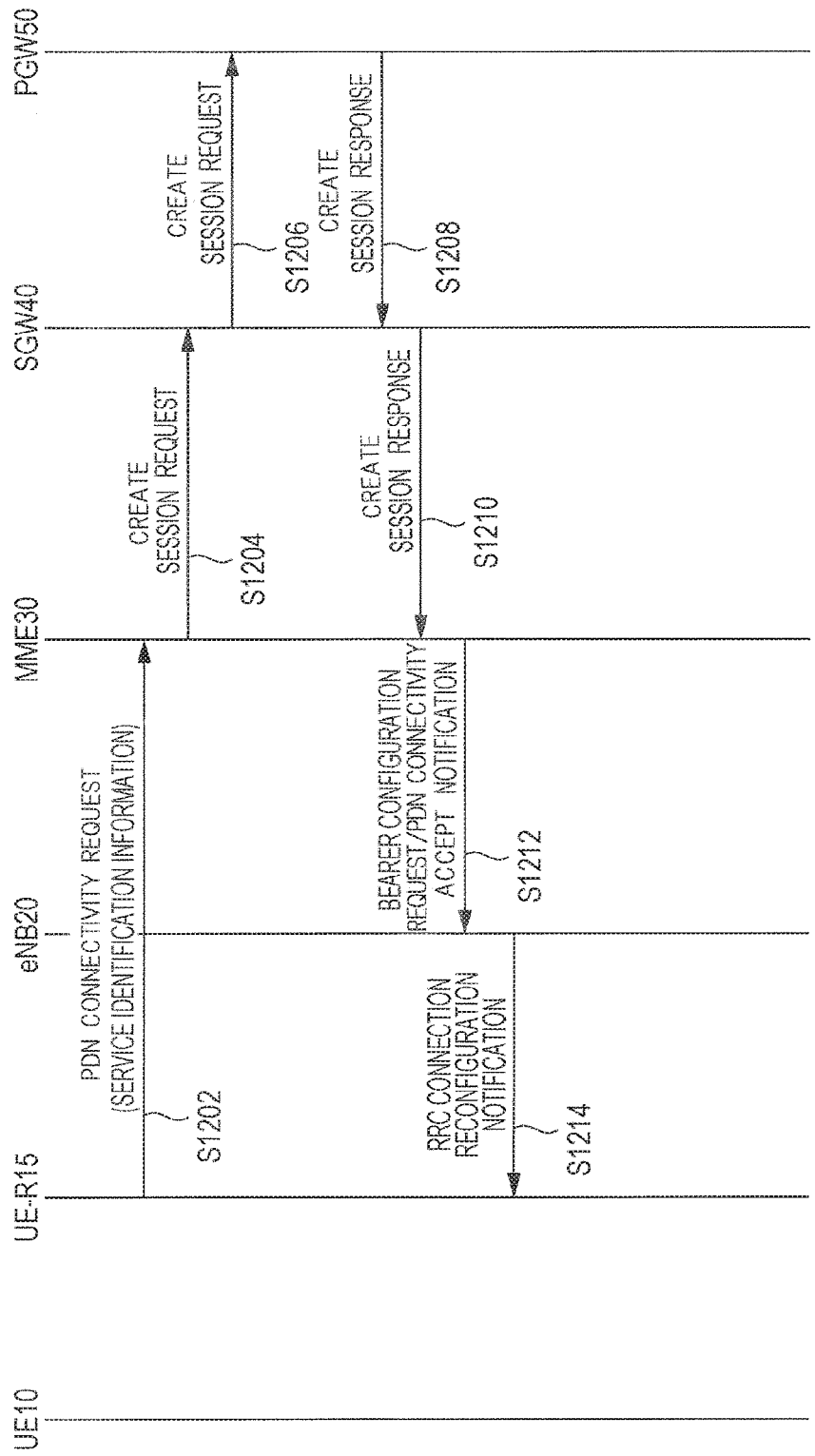
FIG. 12 is a diagram for describing a modification example of the UE communication path establishing procedure.

A modification example of the connection approving procedure (S 1104) in 1.3.3 UE Communication Path Establishing Process described with reference to FIG. 11 will be described with reference to FIG. 12.

The UE-R 15 may newly establish PDN connection in response to the reception of the PDN connectivity request.

The UE-R 15 transmits the PDN connectivity request to the MME 30, and requests the establishment of the PDN connection (S1202).

The PDN connectivity request may include information, such as International Mobile Subscriber Identity (IMSI), for identifying the UE-R 15 or the UE 10, an APN, service identification information, and group identification information.

The service identification information is information for identifying a service provided by the mobile communication provider in the IP mobile communication network 5. The service identification information may be an APN, or may be service domain identification information such as fully qualified domain name (FQDN). The service identification information is not limited to the above-described examples, and may be identification information associated with the service. The service may be a voice communication service based on the IMS or a video distribution service, or may be a service that provides group communication. The service identification information is identification information for identifying such services.

The group identification information may be information for identifying a group when two or more communication terminals constitute the group and communication is performed between the groups. In a case where a plurality of contents is delivered to the group, the group identification information may be information for identifying these contents. For example, the group identification information may be information for identifying the terminal group when a simultaneous phone call is performed between the plurality of communication terminals. Alternatively, the group identification information may be information for identifying a session for the phone call. Alternatively, when image distribution is performed to the plurality of communication terminals, the group identification information may be identification information for identifying the terminals that receives the image distribution as the group, or may be identification information for identifying the distributed image in a case where there are plurality of images.

The group identification information may be an IP multicast address, or may be a temporary mobile subscriber identify (TMSI) which is a temporary ID which is assigned by the communication provider and is used to authenticate a user. The group identification information is not limited to the above-described examples, and may be information, such as a mail address, for identifying the group.

The UE-R 15 may receive the notification information from the eNB 20, and may transmit the PDN connectivity request based on the received notification information. For example, the eNB 20 may transmit the notification information including the APN, service identification information and group identification information which are described above, and the UE-R 15 may receive the APN, service identification information and group identification information from the notification information, and may add the received information items to the PDN connectivity request. As stated above, the information regarding the group communication or the service capable of being provided by the UE-R 15 may be obtained from the notification information. The UE-R 15 may previously retain such information.

As mentioned above, the UE-R 15 may establish the communication path corresponding to the group communication or the service provided to the terminal apparatus connected to the UE-R 15.

The MME 30 receives the PDN connectivity request, and determines whether or not to permit the service for the UE-R 15.

In a case where the service is permitted, the MME 30 transmits the create session request to the SGW 40 (S1204). The MME 30 may select the SGW 40 and may select the PGW 50.

The SGW 40 receives the create session request from the MME 30, and transmits the create session request to the PGW 50 in response to the reception (S1206). Here, the SGW 40 may obtain the selected PGW 50 of the MME 30, and may determine the PGW 50 as the transmission destination.

The PGW 50 receives the create session request from the SGW 40, and transmits the create session response to the SGW 40 (S1208). Here, the PGW 50 may assign the bearer ID, the PDN connection ID, the TEID and the IP address notified by the UE-R 15, and may add these items to the create session response.

The SGW 40 may receive the session response from the PGW 50, and the MME 30 may transmit the create session response (S1210). The SGW 40 may add the received bearer ID, PDN connection ID, TEID and IP address notified to the UE-R 15 to the create session response. The SGW 40 may assign the bearer ID, PDN connection ID and TED, may add these items to the create session response, and may transmit the create session response.

The MME 30 may receive the create session response from the SGW 40, and may transmit the bearer configuration request/PDN connectivity accept notification to the eNB 20 (S1212). The bearer configuration request/PDN connectivity accept notification may include the bearer ID, the PDN connection ID, the TEID and the IP address notified to the UE-R 15. Here, the MME 30 may generate the MME communication path context 442 associated with the PDN connection established between the UE-R 15 and the PGW 50 based on the information included in the create session response.

The APN, the bearer ID, the PDN connection ID and the TED may be obtained from the create session response and may be retained. These items may be assigned by the MME 30. As the base station identification information, the information of the eNB 20 to which the UE-R 15 is connected may be obtained and retained. As the service identification information and the group identification information, the information which is included in the PDN connectivity request and is transmitted by the UE-R 15 may be obtained and retained.

The eNB 20 may receive the bearer configuration request/PN connectivity accept notification, and may transmit RRC connection reconfiguration notification to the UE-R 15 (S1214). Here, the eNB 20 may generate the eNB communication path context 242 associated with the PDN connection established between the UE-R 15 and the PGW 50 based on the information included in the received control information.

The APN, the bearer ID, the PDN connection ID and the TED may be obtained from the bearer configuration request/PN connectivity accept notification and may be retained. The assignment of these items is not limited to the above-described examples, and may be assigned by the eNB 20 and may be retained. As the base station identification information, own identification information of the eNB 20 may be retained. As the service identification information and the group identification information, the information which is included in the PDN connectivity request and is transmitted by the UE-R 15 may be obtained and retained. These information items may be obtained using the control information from the UE-R 15, or may be obtained from the MME 30. The ProSe Server 90 may manage the service identification information and the group identification information associated with the UE-R 15, and the eNB 20 may obtain these information items by inquiring of the ProSe 90 and receiving the notification. The RRC connection configuration notification may include the bearer ID, the PDN connection ID, the TED and the IP address notified to the UE-R 15. The UE-R 15 receives RRC connection reconfiguration notification, and completes the establishment of the PDN connection. The UE-R 15 can perform the communication through the PDN connection by using the obtained IP address. Here, the UE-R 15 may generate the UE-R communication path context 1542 associated with the PDN connection established between the UE-R 15 and the PGW 50 based on the information included in the received control information.

The APN, the bearer ID, the PDN connection ID and the TED may be obtained from the RRC connection reconfiguration notification, and may be retained. The obtaining of these items is not limited to the above-described example, and the UE-R 15 may previously retain these items based on the information included in the PDN connectivity request. As the base station identification information, the identification information of the eNB 20 to which the UE-R 15 is connected may be retained. As the service identification information and the group identification information, the information which is included in the PDN connectivity request and is transmitted by the UE-R 15 may be retained. These items may be obtained using the control information from the eNB 20, or may be obtained from the MME 30. The ProSe Server 90 may manage the identification information of the group communication and the identification information of the service permitted to be provided, and the UE-R 15 may obtain these information items by inquiring of the ProSe 90 and receiving the notification.

As described above, the UE-R 15 can establish the PDN connection with the PGW 50.

The UE-R 15 may obtain the service information associated with the PDN connection and the group information from the ProSe Server 90. The ProSe Server 90 may obtain the information of the MME communication path context from the MME 30, and may generate and retain the ProSe Server communication path context 942.

The communication path context is not limited to the above-described example, and the UE-R 15 may notify the ProSe Server 90 of the generated UR-R communication path context in response to the establishment of the PDN connection. The ProSe Server 90 may generate and retain the ProSe Server communication path context 942 based on the received information.

Thereafter, the UE-R may transmit the response to the PDN connectivity request transmitted from the UE 10 to the UE 10 similarly to the method described in 1.3.3 UE Communication Path Establishing Process.

[1.3.4 Modification Example of UE Connection Procedure]

Figure 8:
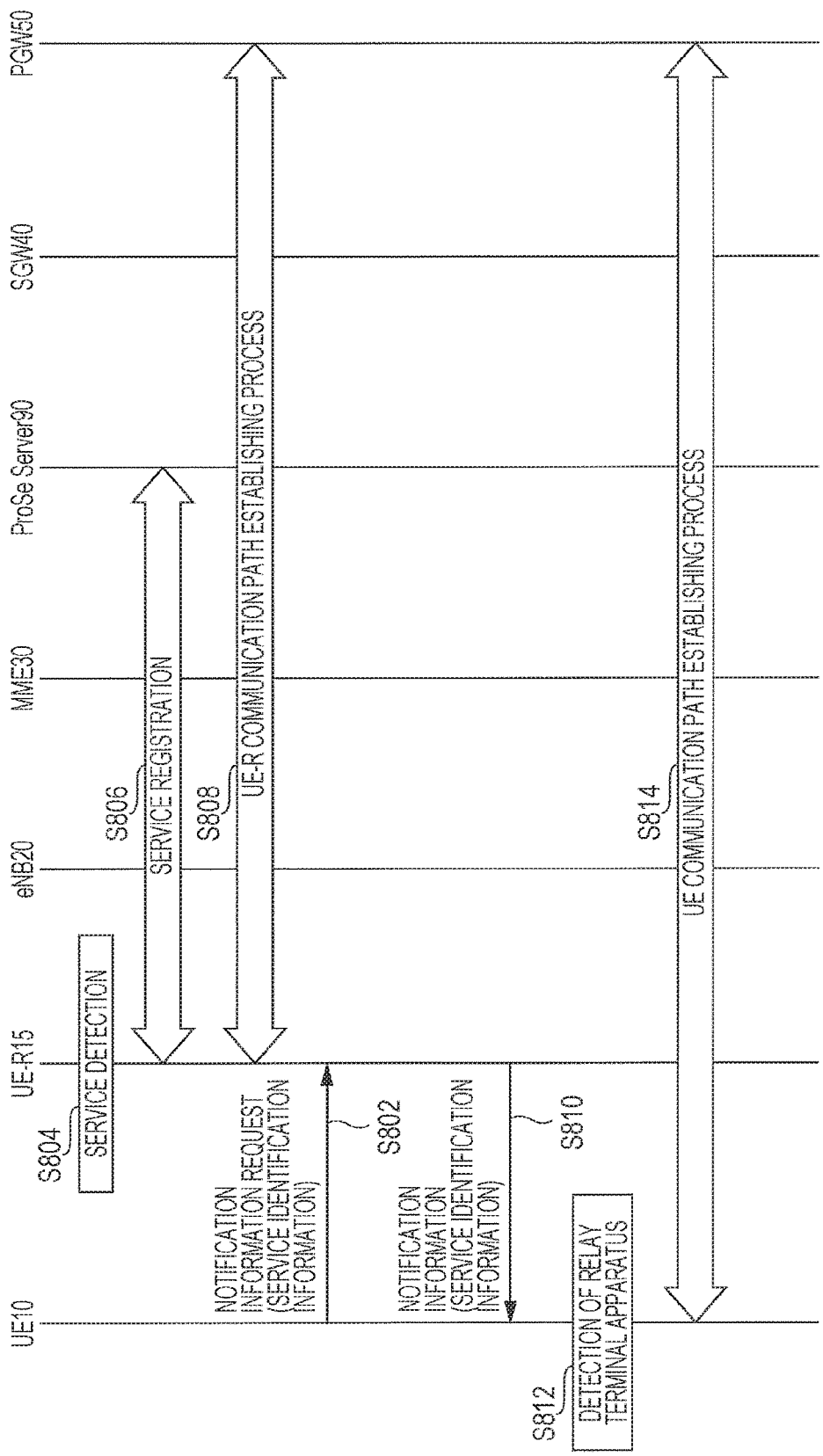
FIG. 8 is a diagram for describing a modification example of the UE connection procedure.

Although it has been described in 1.3.1 UE Connection Procedure that the UE-R 15 detects the service by using the reception of the notification information request from the UE 10 as a trigger and performs the service registration procedure, the UE connection procedure is not necessarily limited thereto, and the service registration may be started without receiving the notification information request of the UE 10, as shown in FIG. 8.

For example the service detection process (S804) may be started without receiving the notification information request. The trigger to start the process may be a user operation through the configuration of the terminal or application by the user of the UE-R 15, or may be programmed such that the process is previously started at the time of startup.

The service registration process (S806) and the UE-R communication path establishing process (S808) may be performed based on the result of the service detection process. The detailed description of such processes based on the result of the service detection process is the same as that of the processes described with reference to FIG. 7 in 1.3.1 UE Connection Procedure, and thus, the detailed description thereof will be omitted.

In the service registration (S806), since the UE-R 15 does not obtain the identification information of the UE 10, the group identification information and the service identification information indicating the service provided by the UE-R may be registered in the ProSe Server 90.

As mentioned above, before the notification information request from the UE 10 is received, the UE-R 15 may previously register the service capable of being provided, and may establish the communication path with the PGW 50. The UE 10 may transmit the notification information request in a case where the UE-R 15 has already established the above-described communication path (S802). The UE-R 15 may receive the notification information request transmitted by the UE 10, and may transmit the notification information based on the notification information request (S810). The UE-R may transmit the notification information and may inform the proximity terminal of the service capable of being provided, based on the completion of the UE-R communication path establishing process or the service registration without receiving the notification information request. The UE 10 may receive the notification information, may detect the relay terminal apparatus (S812), and may perform the UE communication path establishing process (S814). Since there is merely a difference between the trigger to start the respective processes of the service detection (S804), the service registration (S806), the UE-R communication path establishing process (S808), the transmission and reception of the notification information request (S802), the transmission and reception of the notification information (S810), the detection of the relay terminal apparatus (S812) and the UE communication path establishing process (S814) in the procedure and the trigger to start the respective processes of the service detection (S704), the service registration (S706), the UE-R communication path establishing process (S708), the transmission and reception of the notification information request (S702), the transmission and reception of the notification information (S710), the detection of the relay terminal apparatus (S712) and the UE communication path establishing process (S714) described with reference to FIG. 7 in 1.3.1 UE Connection Procedure, the respective processes may be similarly performed, and thus, the detailed description thereof will be omitted.

Although the embodiments and the plurality of modification examples related to the embodiments have been described, the respective modification examples may be independently applied to the first embodiment, or a combination of two or more modification examples may be applied to the first embodiment.

Although the embodiments of the present invention have been described with reference to the drawings, the specific structure is not limited to these embodiments, and designs without departing from the gist of the present invention are included in the scope of the claims.

The programs which run on the apparatuses according to the present embodiments may be programs which control a CPU (programs causing a computer to function) such that the functions of the above-described embodiments are implemented. The information handled by these apparatuses is temporarily stored in a temporary storage device (for example, a RAM) during the process, and then is stored in a storage device of HDD or various ROMs. The information is read, corrected, and written by the CPU if necessary.

Here, as a recording medium that stores the programs, any one of a semiconductor medium (for example, ROM, or non-volatile memory card), an optical recording medium and a magneto-optical recording medium (for example, digital versatile disc (DVD), magneto optical disc (MO), mini disc (MD), compact disc (CD), or BD), or a magnetic recording medium (for example, magnetic tape, or flexible disc) may be used. The functions of the present invention may be realized by performing the process in cooperation with other application programs or an operating system based on the instruction of the program, in addition to realizing the functions of the aforementioned embodiments by executing the loaded program.

When the programs are distributed on the market, the programs may be distributed by being stored in a portable recording medium, or may be transmitted to a server computer connected via a network such as the Internet. In this case, a storage device of the server computer may be included in the present invention.

Some or all of the apparatuses used in the aforementioned embodiments may be realized as large scale integration (LSIs) which are typical integrated circuits. Each functional block of each apparatus may be individually integrated into a chip, or some or all of the functional blocks may be integrated into a chip. A method for achieving the integrated circuit is not limited to the LSI, but may be realized by a dedicated circuit or a general-purpose processor. In addition, in a case where a technique for achieving an integrated circuit which replaces the LSI technique will be developed with the progress of a semiconductor technique, the integrated circuit manufactured by the developed technique can also be used.

REFERENCE SIGNS LIST

1 MOBILE COMMUNICATION SYSTEM
5 IP MOBILE COMMUNICATION NETWORK
7 CORE NETWORK
9 LTE ACCESS NETWORK
10 UE
15 UE-R
20 eNB
30 MME
40 SGW
50 PGW
60 HSS
70 PCRF
80 PDN
90 ProSe Server

The invention claimed is:

1. A relay User Equipment (UE) comprising:
   transmitting and receiving circuitry configured for:
   receiving, from an another UE being in proximity to the relay UE, identification information of a service that the relay UE provides,
   transmitting, to the another UE, a response message containing the identification information of the service that the relay UE provides, based on the reception of the identification information of the service that the relay UE provides, and
   initiating a Packet Data Network (PDN) connection establishment procedure by a transmission of a PDN connectivity request message to a Mobile Management Entity (MME) in a core network, after the reception of the identification information of the service; and
   a controller configured for establishing a PDN connection for relaying a communication between the another UE and a PDN based on the PDN connection establishment procedure,
   wherein:
   the transmitting and receiving circuitry is further configured for relaying a communication between the another UE and the PDN by using the PDN connection after the PDN connection establishment procedure,
   the relay UE has a function for providing a connectivity for the another UE, and
   the response message is usable by the another UE to select the relay UE providing the PDN connection.

2. A User Equipment (UE) comprising:
   transmitting and receiving circuitry configured for:
   transmitting, to a relay UE being in proximity to the UE, identification information of a service that the relay UE provides, and
   receiving, from the relay UE, a response message containing the identification information of the service that the relay UE provides, as a response of the transmission of the identification information of the service that the relay UE provides; and
   a controller configured for selecting the relay UE providing a Packet Data Network (PDN) connection by using the response message,
   wherein:
   the relay UE has a function for providing a connectivity for the UE, and
   the transmitting and receiving circuitry is further configured for communicating with a PDN by using the PDN connection established by the selected relay UE.

3. A User Equipment (UE) comprising:
   transmitting and receiving circuitry configured for receiving, from a relay UE being in proximity, a message containing identification information of a service that the relay UE provides; and
   a controller configured for:
   discovering the relay UE based on the reception of the message, and
   establishing a direct communication path between the UE and the relay UE,
   wherein:
   the transmitting and receiving circuitry is further configured for communicating with a Packet Data Network (PDN) by using a PDN connection established by the relay UE, and
   the relay UE has a function for providing a connectivity for the UE.

4. A relay User Equipment (UE), comprising:
   a controller configured for establishing a Packet Data Network (PDN) connection for relaying a communication between (i) an another UE being in proximity to the relay UE and (ii) a PDN; and
   transmitting and receiving circuitry configured for transmitting, to the another UE, a message containing identification information of a service that the relay UE provides,
   wherein:
   the message is usable for the another UE to discover the relay UE,
   the controller is further configured for establishing a direct communication path between the relay UE and the another UE,
   the transmitting and receiving circuitry is further configured for relaying a communication between the another UE and the PDN by using the PDN connection, and
   the relay UE has a function for providing a connectivity for the another UE.

* * * * *